(12) United States Patent
Kobayashi

(10) Patent No.: US 6,343,869 B1
(45) Date of Patent: Feb. 5, 2002

(54) LIGHT UNIT FOR VEHICLE

(75) Inventor: Shoji Kobayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 08/991,985

(22) Filed: Dec. 17, 1997

(30) Foreign Application Priority Data

Dec. 18, 1996 (JP) .............................. 8-353999

(51) Int. Cl.[7] ................................ B60Q 1/00

(52) U.S. Cl. ..................... 362/37; 362/464; 362/324; 362/284; 315/77; 315/81

(58) Field of Search ................................ 362/466, 464, 362/276, 802, 37, 351, 359, 319, 324, 277, 282, 284, 322; 315/81, 77, 82

(56) References Cited

U.S. PATENT DOCUMENTS

| | | | | |
|---|---|---|---|---|
| 4,768,135 A | * | 8/1988 | Kretschmer et al. | ......... 362/466 |
| 5,562,336 A | * | 10/1996 | Gotou | ......................... 362/37 |
| 5,645,338 A | * | 7/1997 | Kobayashi | .................. 362/466 |

FOREIGN PATENT DOCUMENTS

| | | | |
|---|---|---|---|
| DE | 43 34 670 | * | 4/1995 |
| DE | 196 01 572 | * | 8/1996 |
| DE | 196 02 622 | * | 8/1996 |
| DE | 195 23 262 | * | 1/1997 |
| DE | 195 48487 | * | 6/1997 |

* cited by examiner

Primary Examiner—Thomas M. Sember
(74) Attorney, Agent, or Firm—Sughrue, Mion, Zinn, Macpeak & Seas, PLLC

(57) ABSTRACT

A light unit 1 for a vehicle has a driving-environment detecting device 2 for detecting information (the shape of the road, the position of the vehicle, whether or not oncoming and preceding vehicle exist, the traffic volume density and ambient luminous intensity) indicating a driving environment provided by a path through which a vehicle is driven. A mode determining device 3 determines a driving mode which is included in driving modes classified in accordance with combinations of information detected by the driving-environment detecting device 2 and which is dynamically changed when the driving environment is changed during driving of the vehicle. In accordance with an instruction signal supplied from the mode determining device 3 to an illumination control device 4 and corresponding to the driving mode, illumination which is performed by the light unit 5 is controlled.

9 Claims, 20 Drawing Sheets

LIGHT UNIT FOR VEHICLE

FIELD OF THE INVENTION

The present invention relates to a light unit for a vehicle arranged to control illumination which is performed by the light unit in any one of driving modes classified in accordance with the diving environment in which the vehicle is driven.

BACKGROUND OF THE INVENTION

A conventional apparatus for controlling the illumination performed by a light unit based on the driving environment includes an image pickup means for always monitoring a state of a road or the like in front of the vehicle to successively change the distribution of light which is emitted from the light unit in a manner adaptable to change in information indicating result of monitoring.

The environment in which a vehicle is driven includes a variety of roads, such as mountain roads, roads in urban areas, expressways, bypass roads, and the like. Moreover, the traffic density varies according to time and places. Since the driving environment for a vehicle varies according to the present position of the vehicle and a lapse of time, the above-mentioned successive control of the illumination which is performed by the light unit excessively increases the load which must be borne by a drive portion of the light unit, thereby causing the durability of the drive portion to deteriorate. Further, if the illumination control over sensitively responds to change in the driving environment, the vehicle's driveability deteriorates.

To prevent the above-mentioned problems, it might be feasible to employ a method of reducing the response speed of the illumination control performed by the light unit. However, a slowed controlling operation is unsafe if the driving environment is changed rapidly.

An object of the present invention is to control the illumination performed by a light unit in a manner adaptable to change in the driving environment in which a vehicle is driven without any disadvantage load increases being borne by a drive portion of the light unit and any delay of control.

SUMMARY OF THE INVENTION

To achieve the above-mentioned problems, according to one aspect of the present invention, a light unit for a vehicle comprises driving-environment detecting means for detecting information indicating a driving environment provided by a path on which a vehicle is driven; mode determining means for determining a driving mode which is included among driving modes that represent combinations of information detectable by the driving-environment detecting means and which is dynamically changed when the driving environment is changed during driving of the vehicle; and illumination control means for controlling illumination which is performed by the light unit of the vehicle in accordance with an instruction signal supplied from the mode determining means and corresponding to the driving mode.

According to the present invention, the mode determining means determines the driving mode of the vehicle in accordance with the detected driving environment in which the vehicle is driven. The illumination performed by the light unit is controlled according to the determined driving mode which changes with the detected driving environment. Thus, excessive response of the control response time or delay in the control with respect to change in the driving environment is prevented.

DETAILED DESCRIPTION OF THE INVENTION

Figure 1:
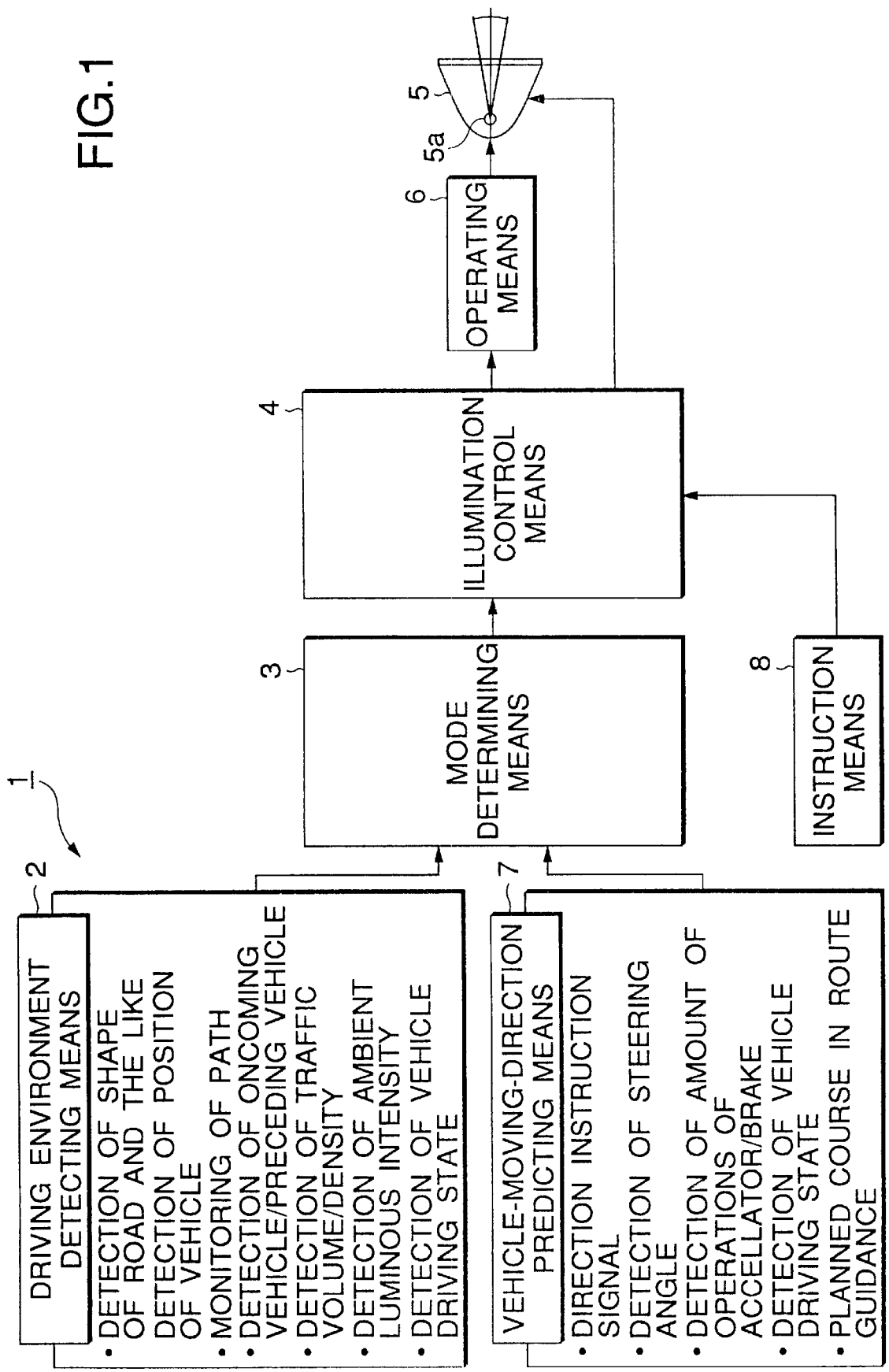
FIG. 1 is a block diagram showing the basic structure of a light unit for a vehicle according to the present invention.

FIG. 1 is a diagram showing the basic structure of a light unit 1 for a vehicle according to the present invention and comprising a driving-environment detecting means 2, a mode determining means 3 and an illumination control means 4.

The driving-environment detecting means 2 detects information of the driving environment in which the vehicle is driven and transmits the detected information to the mode determining means 3.

The mode determining means 3 determines the driving mode of the vehicle in accordance with information obtained from the driving-environment detecting means 2 so and transmits a control signal, based on the driving mode to the illumination control means 4.

The "driving mode" of the vehicle classifies combinations of information detected by the driving-environment detecting means 2 and dynamically changes when the driving environment is changed during driving of the vehicle (including a shift from stop to drive or a converse shift). The classification is performed on a variety of driving environment information, for example, whether or not the vehicle is being driven on an expressway or whether the vehicle is being driven on a road in an urban area having a large traffic volume (as described later).

The illumination control means 4 receives the control signal supplied from the mode determining means 3 to directly, or through a drive means 6, operates the light unit 5 to control illumination which is performed by the light unit 5 and to control timing of a light source 5a of the light unit 5 at which the light source 5a is turned on or off. The light unit 5 for an automobile includes a head lamp, a fog lamp, a cornering lamp or the like.

Basic information used to detect the driving environment includes the following:

(I) shape of road;
(II) structure on the road;
(III) specification and grade of the road
(IV) area and region through which the vehicle is driven;
(V) whether or not an oncoming vehicle or a preceding vehicle exists;
(VI) traffic volume and density;
(VII) ambient luminous intensity; and
(VIII) atmospheric phenomena (weather and the like).

Item (I) includes the shape of the road (a straight road, a curved road, the curvature radius, the gradient of the road and the like), on which the vehicle is driven, the structure (the number of lanes, the width of the lane and the like) of the road and a fact whether or not an intersection (a cross-shape intersection, a T-shape cross section, and the like included) or a Y-shape intersection exists in front of the vehicle.

Item (II) includes a tunnel, an antiglare fence it and a bridge-type structure including a footbridge, a multilevel intersection and the like.

Item (III) includes a distinction between an expressway and an open road and classification of the road (for example, first, second and third class). Item (IV) includes classification of urban areas, suburbs, mountain areas and seashores.

Item (V) is a factor whether or not an oncoming vehicle or a preceding vehicle exists. Item (VI) is a quantity obtained by counting oncoming vehicles and preceding vehicles. The "traffic volume" indicates a total of oncoming vehicles and preceding vehicles in a predetermined range or within predetermined time. The "traffic density" indicates a traffic volume per unit distance and unit time.

Item (VII) is the ambient luminous intensity for the vehicle which is basic information for determining timing at which the light unit is turned on and for adjusting the quantity of light for illumination.

Item (VIII) includes, clear weather, cloudy weather, rain, fog, snow and the like.

Among the foregoing information items, (I) to (IV) can be obtained by a structure in which the driving-environment detecting means 2 has means for detecting information including the shape and structure of a road 16 and present position of the vehicle or means for monitoring the path in accordance with image information supplied from an image pickup means for photographing the path.

Accordingly, information including the shape of the road indicated on a map, information about the present position of the vehicle, and various information items about the road on which the vehicle will be driven can be obtained.

Road map information may be input by a navigation system (a so-called "car navigation system") using radio waves emitted from, for example, GPS (Global Positioning System) satellites or a system using communication between the road and the vehicle. The former system is arranged in such a manner that a detection signal obtained from a gyroscopic sensor or a car-speed sensor, information of radio waves supplied from the GPS satellites and received by a GPS receiver thereof and information on a map recorded on a recording medium (a CD-ROM or the like) are used to display the present position of the vehicle on the road map. Moreover, the vehicle can be guided along a planned course which reaches a destination. The latter system is arranged to use information from beacons (communication poles for establishing the communication between the vehicle and the road) provided on the median strip of a main highway, a road shoulder at predetermined intervals (the distance which permits the communication), main corners or intersections in an urban area, or a mountain road having impediments. In this way, information about the position of the vehicle on the road, shape of the road and the like can be obtained.

Moreover, a system using a sub-channel of an FM multiplexed communication is available. It is essential that information about the shape of the road and information about the present position of the vehicle can be obtained. Therefore, any structure may be employed if the information above can be obtained.

In a case where an image pickup means (a CCD camera or the like) for photographing the road ahead of the vehicle is attached to the vehicle to identify the shape and the like of the road by analyzing image information obtained from the image pickup means, it is preferable that the foregoing system be employed in such a manner to avoid a time delay occurring because of the image processing operation.

Information about item (V) can be obtained by a method in which the oncoming vehicle or the preceding vehicle is detected by using an image pickup means or a method in which light for illumination or signal light emitted from the oncoming vehicle or the preceding vehicle is detected by a light detecting means (a glare sensor or the like). The preceding vehicle can be detected by a method using a radar or a sensor for detecting the distance between vehicles which uses detecting waves, such as radio waves or ultrasonic waves. If information about the oncoming vehicle or the preceding vehicle can be detected, the traffic volume and the traffic density in item (VI) can be calculated.

The ambient luminous intensity (item (VII)) can be detected by a luminous-intensity detecting means attached to the vehicle. The atmospheric phenomena (item (VIII)) can be determined in accordance with information obtained by means for detecting temperature, humidity and the barometric pressure or an instruction signal supplied to the wiper.

When the illumination performed by the light unit is controlled, it is preferable that also information about an intention of the driver is considered as well as the foregoing driving environment factors.

That is, the vehicle-moving-direction predicting means 7 is provided as shown in FIG. 1. Thus, the vehicle moving direction intended by the driver is predicted in accordance with the operation signal issued by the driver of the vehicle or detected information about the state of driving of the vehicle. A result of the prediction is transmitted to the mode determining means 3. As a result, if the driver drives the vehicle on a road which is not shown on the map, illumination control can be performed in such a manner that the light unit 5 directs the illumination to the predicted direction.

Information used to predict the vehicle moving direction may include:

(a) a directional instruction signal which is supplied to a direction indicator;

(b) a steering angle (steering angle of the steering wheel);

(c) quantity of operation of a brake pedal and an accelerator pedal;

(d) vehicle speed;

(e) acceleration;

(f) detected signal of the attitude of the vehicle (an output signal from a vehicle height sensor; and (g) a planned course which reaches a destination set by a navigation system having a route guidance function.

The vehicle-moving-direction predicting means 7 comprehensively predicts the vehicle moving direction intended by the driver in accordance with the above-mentioned signals, rather than exclusively relying upon a single item of information such as, for example, the direction instruction signal. Change in the steering angle occurring from transmission of the direction instruction signal is successively detected to determine whether or not a preliminary action for turning to a direction indicated by the directional instruction signal is permitted in accordance with change in the attitude of the vehicle, speed, acceleration and a state of driving the vehicle. Thus, the action of the vehicle is predicted. That is, change in the action of the vehicle is detected before the route of the vehicle is changed. Thus, an extrapolated direction is determined to be a direction of movement of the vehicle.

An example of the predicting process will now be described. In this case, a simple model is used in which the direction (right and left) and existence of an instruction are detected from the direction indicator. Moreover, only the direction and degree of change in the steering angle and direction and magnitude of the acceleration are determined. When the direction instruction signal has been transmitted, a temporary prediction is made that a change in direction is intended. If the steering angle is changed considerably over time or if acceleration is performed over a predetermined range, a determination is made that the prediction has been confirmed. If the steering angle is not changed considerably over time and the vehicle is not decelerated, the foregoing prediction is corrected. Thus, a determination is made that change in direction is not intended. If the steering angle is changed considerably over time of if the vehicle is rapidly decelerated although no direction instruction signal has been transmitted, a determination is made that a change in direction is intended. Note that the importance of basic information for the prediction is not required to be uniform. As a matter of course, weight may arbitrarily be given to correspond to the value of information.

The prediction of the vehicle moving direction may use information about the above-mentioned shape of the road. For example, the distance from a junction of a road in front of the vehicle to a present position of the vehicle is calculated to detect how the steering angle is changed as the distance is shortened. If the steering angle is not changed considerably, a prediction is made that the vehicle will be driven straight. If the steering angle is changed considerably, a prediction is made that a change in moving direction is intended.

The driving mode of the vehicle which is determined by the mode determining means 3 depends on the complexity of the driving environment. Since, for example, an automobile has many classified modes, all modes cannot easily be listed. Therefore, the following representative modes will be described:

(i) Mode of Driving on Road Having Junction;

(ii) Automatic Light-On Mode;

(iii) Tunnel Passage Mode;

(iv) Mode of Driving Below Bridge;

(v) Mode of Driving on Road Having Antiglare Countermeasure;

(vi) Expressway Driving Mode;

(vii) Urban Area Driving Mode;

(viii) Suburb Road Drive Mode;

(ix) Curve Driving Mode; and (x) Oncoming Vehicle Mode.

Mode (i) is a driving mode which is determined when a junction, such as an intersection, exists in front of the road on which the vehicle is being driven. To determine the existence, information about the shape of the road, the structure and prediction of the vehicle moving direction is used.

In the foregoing case, it is preferable that the illumination control means 4 reduces the quantity of light which is emitted from the side light units attached to the side portions of the vehicle at a point before the vehicle reaches the junction by a predetermined time or for a predetermined distance. The reason for this lies in that a pedestrian or a driver of another vehicle (hereinafter "road users") is shocked if the side light unit is suddenly turned on immediately before the vehicle approaches the junction.

When the foregoing control is performed in such a manner that the quantity of light emitted from the side light units is gradually enlarged as the vehicle approaches the junction after the quantity of light emitted from the side light units has been reduced, the driver is able to recognize the portion including the junction with satisfactory visibility.

It is preferable that the quantity of light which is emitted from the side light units be controlled in such a manner that the quantity of light is made to be maximum at a point apart from the junction for a predetermined distance. The reason for this is that the road user is dazzled if the quantity of light for illumination is made to be maximum at the position at which the vehicle reaches the junction or a position immediately before the junction.

If plural junctions are formed on the road at if intervals (for example, if the vehicle is being driven on a road having successive intersections formed in the vehicle moving direction apart from each other for intervals shorter than a predetermined distance), the foregoing control of the quantity of light for illumination is not performed. As an alternative to this, it is preferable that the quantity of light for illumination be made to be constant. Thus, a delay in control of the illumination (the control for reducing the quantity of light which is emitted from the light unit cannot be performed in time for passing through the next intersection) is avoided. Moreover, a load which must be borne by the means for operating the light unit is reduced. The criterion for determining the distance between intersections may be made to be a constant value or may be changed to correspond to the car speed.

Mode (ii) is provided for a vehicle having a luminous intensity detecting means for detecting ambient luminous intensity and arranged in such a manner that the illumination control means 4 automatically controls when the light unit 5 is turned on/off and the quantity of light emitted from the same to correspond to change in the ambient luminous intensity. If the ambient luminous intensity is reduced, for example, after sunset, the light unit is turned on. Also, the quantity of light for illumination is controlled to be a proper quantity in the evening or at dawn. Note that basic information for determining the mode includes the ambient luminous intensity, time, day, time of sunrise and sunset, and the like.

Mode (iii) is determined when a tunnel is formed in front of the road on which the vehicle is being driven. To determine the foregoing mode, information about the shape of the road, structures and prediction of the vehicle moving direction is used.

When the foregoing mode is determined, the illumination control means 4 automatically turns the light unit on in front of the entrance to the tunnel. It is preferable that the light unit be turned on when, for example, the distance from the position of the vehicle to the tunnel entrance is shorter than a criterion which is obtained by multiplying the car speed with a predetermined time. The reason for this lies in that the approach time differs depending upon the car speed.

If a determination is made that no tunnel is formed in front of the road on which the vehicle is being driven, the ambient luminous intensity of the vehicle has temporarily been changed, and the width of the change exceeds a predetermined range, it is preferable that the light unit remains turned off. The reason for this lies in that frequent turning of the light unit on/off must be inhibited when the vehicle passes below a bridge, for example, a footbridge.

When the vehicle does not emerge from the tunnel after the vehicle has been driven for a predetermined distance from the present position or after a predetermined time elapses, it is preferable that the light unit remain turned on. The reason for this lies in that a rise in the luminous intensity occurring near the end of the tunnel or a detection of increased luminous intensity occurring because, for example, illumination lights in the tunnel undesirably turns the light unit off.

If a tunnel having intermittent openings or a plurality of tunnels exist in front of the vehicle, time required for the vehicle to pass through the region between the intermittent openings or the plurality tunnels is predicted. If the driving time is not longer than a predetermined range, it is preferable that the state in which the light unit is turned on be maintained. If the light unit is turned off immediately before the end of the tunnel, the light unit is undesirably and frequently turned on and off during passage for the vehicle between the intermittent openings of the tunnel or between the tunnels. If a light unit of a type comprising a discharge lamp as a light source thereof is frequently and repeatedly turned on and off, the lifetime of the light source is shortened. Therefore, it is preferable that the state in which the light unit is turned on be maintained in the above-mentioned driving environment.

Mode (iv) is a mode which is determined when a bridge-shape structure, such as a footbridge or a grade separation is formed in front of the road on which the vehicle is being driven and the vehicle is predicted to pass below the bridge. To make a determination, information about the shape of the road, structures on the road and prediction of the vehicle moving direction is used.

In this mode, change in the ambient luminous intensity which temporarily occurs when the vehicle is driven below the bridge is predicted. Thus, even if the ambient luminous intensity of the vehicle is considerably changed, the luminous intensity detection signal is ignored in such a manner that the foregoing change is not regarded as useful information. Therefore, false lighting of the light unit is prevented.

Mode (v) is determined when the vehicle is driven on a road having a structure (an antiglare fence or the like) for antiglare. To make the determination, information about the shape of the road, structures on the road and information about the prediction of the vehicle moving direction is used. Thus, whether or not the vehicle is being driven on a road having a median strip or whether or not the vehicle is being driven on a road having a guard rail or the like is determined.

In the foregoing mode, it is preferable that the light for illumination which is emitted from the light unit be controlled vertically. If an automobile is driven on a road having an antiglare fence, the height of a cut line of the low beam distribution is made to be somewhat higher as compared with a reference height. In a case where the antiglare fence or the like is disposed, distant visibility can be improved without the driver of the oncoming vehicle being dazzled. The foregoing mode is effective when a vehicle is driven on an expressway.

Modes in (vi) to (viii) are given names which correspond to a setting in which the vehicle is being driven. To make each determination, information about the shape of the road and structures on the road and that about the prediction of the vehicle moving direction are used.

It is preferable that each of the foregoing mode be further finely sectioned to correspond to the traffic volume or the traffic density.

When the vehicle is driven on, for example, a road having a large traffic volume or a high traffic density, the height of the cut line of the low beam distribution of the headlight is fixed to a predetermined height or controlled not to exceed an upper limit for the height control of the cut line. Thus, the driver and the road user are not dazzled. When the range of illumination of the light unit is widened to the oncoming vehicle lane, a sufficiently long visible distance for a pedestrian is provided for the oncoming vehicle. If the vehicle is driven on a road having a small traffic volume or a low traffic density, it is preferable that the range of illumination which is performed by the light unit be enlarged as compared with the illumination range which is employed when the vehicle is driven on a road having a large traffic volume or a high traffic density. The reason for this lies in that the possibility that the road user is dazzled must be lowered on, for example, a road having a large traffic volume.

Mode (ix) is determined when the vehicle is driven on a road, such as a mountain road, having many curves. To make the determination, information about the road and structures on the road and information about the prediction of the vehicle moving direction are used.

In the foregoing mode, the illumination which is performed by the light unit is controlled according to the shape of the road in a direction in which the vehicle will be driven. If the vehicle is driven on a road which is not included in information on the road map, the vehicle-moving-direction predicting means 7 controls the illumination which is performed by the light unit to be directed to the vehicle's predicted moving direction.

Mode (x) is determined when the vehicle passes an oncoming vehicle. To make the determination, information obtained by a light detecting means is used.

In this mode, the beam for illumination which is emitted from the headlight of the vehicle is changed from a high beam to the low beam to prevent the driver of the oncoming vehicle from being dazzled. Alternatively, the range illumination which is performed by the light unit is widened to the oncoming vehicle lane to maintain a sufficiently long distance for the driver of the oncoming vehicle to visibly recognize a pedestrian or the like.

It is preferable that the foregoing driving-environment detecting means 2 include a vehicle driving state detecting means for detecting a state of driving of the vehicle including the car speed, acceleration and the like. As an alternative to this, it is preferable that information about the detected vehicle driving state which is used by the vehicle-moving-direction predicting means 7 be used. Accordingly, the illumination control is not regulated depending exclusively upon the driving environment in which the vehicle is driven, thereby avoiding problems that would otherwise arise. For example, if the vehicle is being driven on an expressway, the vehicle is not always driven at high speed. As described above, the vehicle driving state cannot be ignored with respect to the driving environment. Note that the car speed can be detected by a conventional speed detecting means for a vehicle. The acceleration of the vehicle can be detected by a method in which an acceleration detecting means is attached or a method in which the car speed detected by the speed detecting means is first-differentiated.

The illumination control means 4 controls illumination performed by the light unit to follow a control instruction issued from the mode determining means 3 and indicating the driving mode. The controlled factors are as follows:

(A) direction of illumination;
(B) range for illumination;
(C) quantity of light for illumination;
(D) time at which light unit is turned ON/OFF and control start time;
(E) controlling speed;
(F) light distribution;
(G) height of cut line; and
(H) controlled range.

The direction of illumination (item (A)) is divided into two methods below.

(A-1) A method in which light for illumination is fully directed to a predetermined direction.
(A-II) A method in which a portion of light for illumination is directed to a predetermined direction.

Item (A-1) is a method in which the overall body of the light unit is rotated around a rotational shaft thereof to direct the axis of illumination which is performed by the light unit to the predetermined direction. Another method may be employed in which the attitude of a component (for example, a reflecting mirror, a lens, a light source, a light shielding member or the like) of the light unit is controlled to fully direct the optical axis of the optical system to the predetermined direction.

In item (A-II), a method may be employed in which only one or more axes of illumination (for example, only one or two axes of illumination of one or more members of head lamp, a fog lamp and a cornering lamp of an automobile of a type comprising these lamps are changed) of an apparatus composed of a plurality of light units are changed. Another method may be employed in which one or more attitudes of one or more members of components of the light unit are controlled (for example, the reflecting mirror is composed of a stationary reflecting mirror and a movable reflecting mirror to direct the optical axis of the movable reflecting mirror to the predetermined direction).

The control of the illumination range (item (B)) may be realized by either one of the following methods:

(B-1) A method in which ranges of illumination o which is performed by a plurality of light units are combined with one another; and
(B-2) A method in which a portion of the component of the light unit is moved to change the illumination range.

Figure 2:
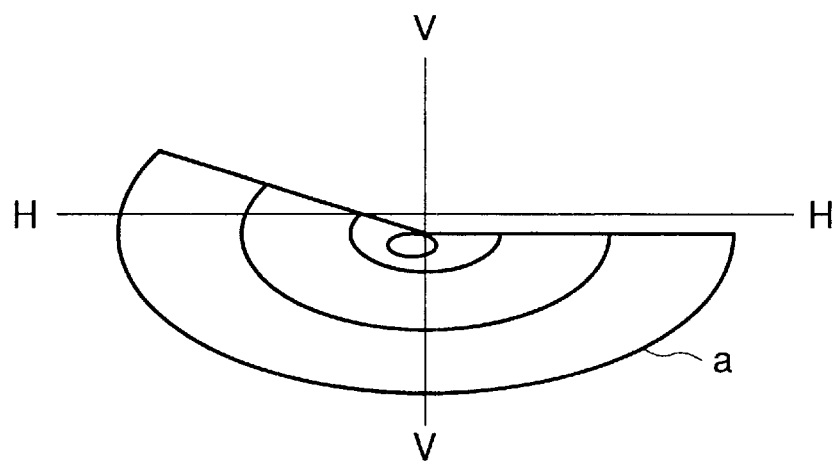
FIG. 2 is a graph schematically showing a light distribution pattern of a low beam of a head lamp for an automobile.
Figure 3:
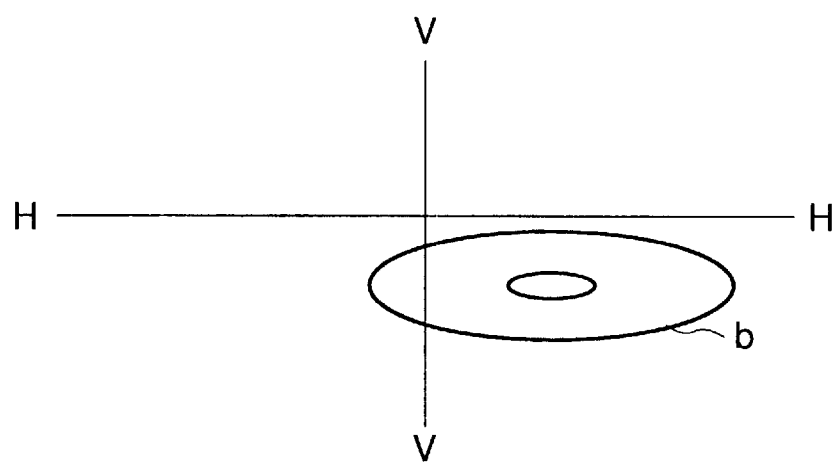
FIG. 3 is a graph schematically showing a light distribution pattern of a fog lamp for the automobile.
Figure 4:
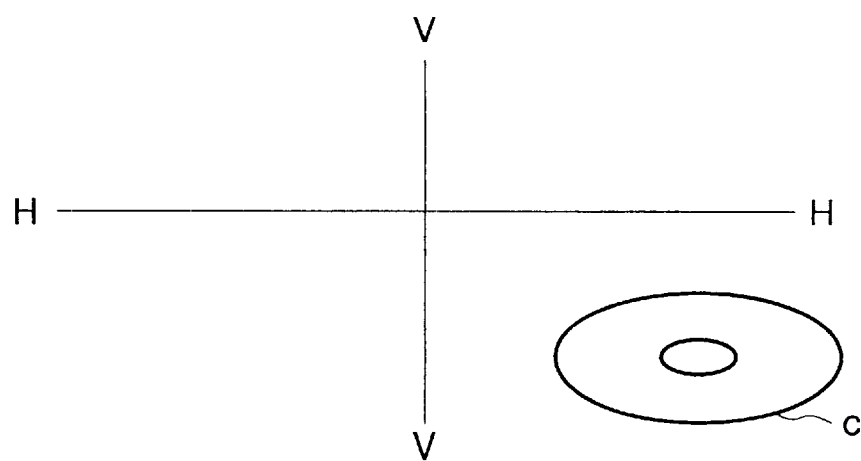
FIG. 4 is a graph schematically showing a light distribution pattern of a cornering lamp for the automobile.

In item (B-1), an apparatus synthesizes the ranges of illumination performed by a plurality of light units so as to create the overall illumination range thereof. The ranges of illumination is performed by a portion of the light units are controlled. For example, a method may be employed in which two light units having different illumination ranges are provided for a vehicle so that the range of illumination which is performed by either of the light units is fixed and that of another light unit is varied (for example, the illumination range is widened to the right and left). For illustration, a light unit for an automobile comprises head lamps, fog lamps and cornering lamps. Light distribution pattern a of the low beam as shown in FIG. 2 and light distribution pattern b of the fog lamp shown in FIG. 3 and/or light distribution pattern c of the cornering lamp shown in FIG. 4 are synthesized to control the expansion of the illumination range in the horizontal direction. When a side light unit for irradiating a specific illumination range is attached to the vehicle, the illumination range can be varied by turning the light unit on. Note that FIGS. 2 to 4 schematically show light distribution pattern of each of the light units provided for the front right portion of the vehicle. Referring to the drawings, line H—H indicates a horizontal line and line V—V indicates a vertical line.

The foregoing method enables a required illumination range to be obtained by selecting a portion of the foregoing light units having different illumination ranges. Since the size of the apparatus is enlarged excessively, it is preferable that the method in item (B-2) be employed if the structure of the apparatus must be simplified.

That is, the range of the illumination which is performed by the light unit can be varied by changing the attitudes of one or more components of the light unit. As an example method in which movement of a lens is used, a structure may be employed in which the relative positions of the two lenses can be adjusted so as to arbitrarily control the degree of diffusion of light for illumination when the lenses are moved. A structure may be employed in which the range of the illumination which is performed by the light unit is varied by moving a shade provided for shielding a portion of light emitted from the light source. A variety of examples may be formed by combining optical components in such a manner that only the light source is moved or the collective movement of the reflecting mirror and the light source or the lens and the reflecting mirror or the lens and the shade is employed to vary the illumination range.

Figure 5:
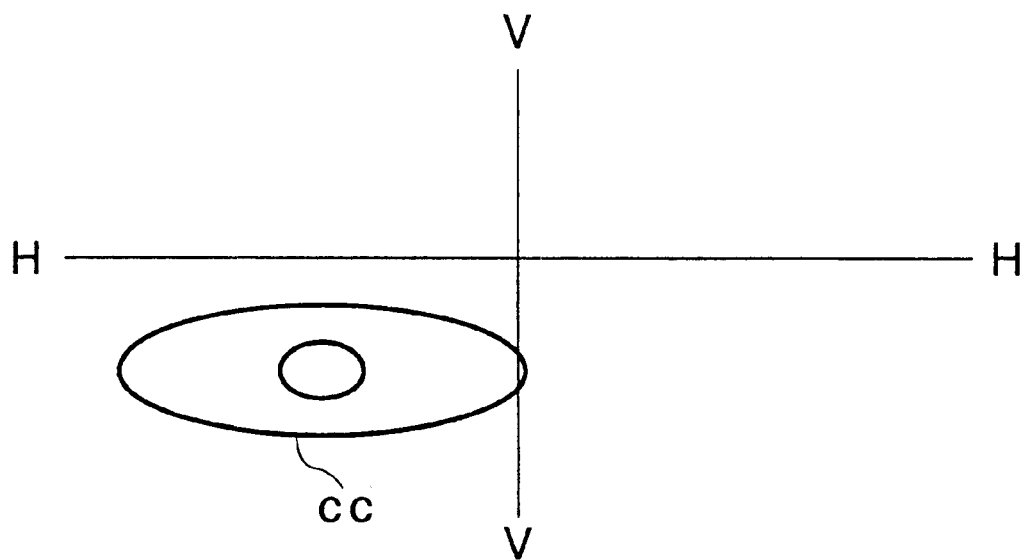
FIG. 5 is a graph schematically showing a light distribution pattern of a fog lamp for the automobile when light is controlled to be converged.
Figure 6:
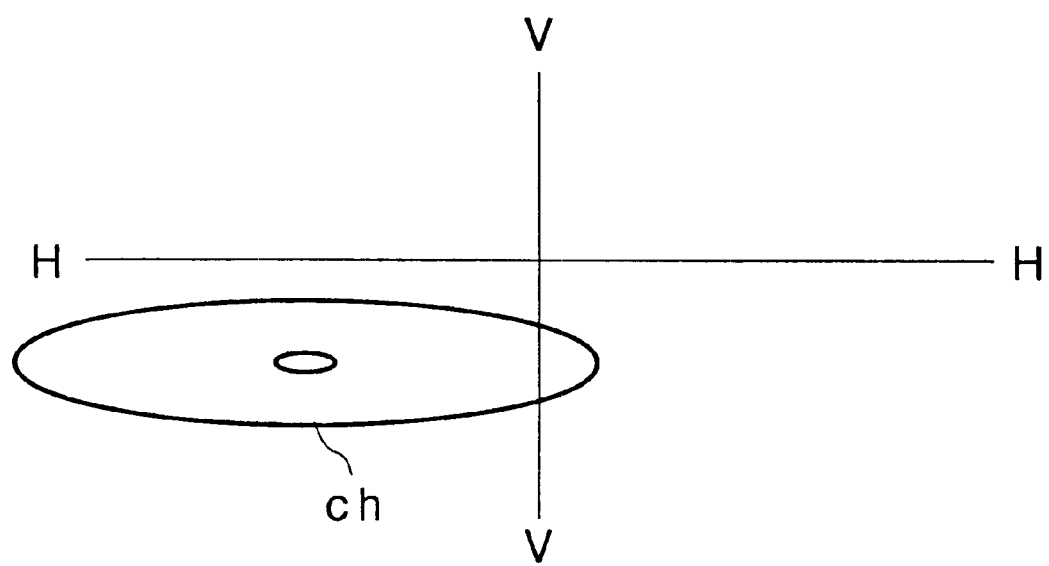
FIG. 6 is a graph schematically showing a light distribution pattern of a fog lamp for the automobile when light is controlled to be diffused horizontally.

For example, a vehicle having head lamps and cornering lamps as light units thereof is considered. When the light distribution pattern a of the low beam as shown in FIG. 2 and a light distribution pattern cc shown in FIG. 5 and realized when control to converge light beams from the fog lamp is performed or light distribution pattern ch as shown in FIG. 6 and realized when control is performed to inhibit horizontal diffusion of the fog lamp are synthesized, expansion of the illumination range can be prevented. FIGS. 5 and 6 schematically show light distribution patterns of the light units provided for the front right portion of the vehicle.

It is preferable that the width of the illumination range be changed to correspond to the car speed and the acceleration. The reason for this lies in that the range of the visibility of a driver differs between a mode in which the vehicle is driven at high speed and a mode in which the vehicle is driven at low speed and between a mode in which the vehicle is driven at constant speed and a mode in which the speed is rapidly decelerated. It is preferable that the illumination range be widened when the vehicle is driven at low speed or the speed of the vehicle is rapidly decelerated as compared with the illumination range in the other states of driving.

As for the quantity of light for illumination (item (C)), a method may be employed in which the quantity of light which is emitted from each light unit is comprehensively changed. Another method may be employed in which the quantity of light which is emitted from only a portion of the light units is changed or the light unit is turned on/off to change the overall quantity of light for illumination. The quantity of light can be adjusted by a method in which the quantity of light which is emitted from the light source is changed or a method in which movement of a filter member or a light shielding member is controlled to adjust the quantity of light.

To adjust the time at which the light unit is turned on/off (item (D)), a method may be employed in which timing at which all of the light units are turned on or off is adjusted or a method in which timing at which a portion of the light units is turned on or off.

The time at which the light unit is turned on may be adjusted in a case of a road having a junction in such a manner that whether or not the distance from the junction to the vehicle or time obtained by dividing the distance by the car speed is included in a predetermined range. In accordance with a result of the determination, the time at which control of the illumination (the change of the illumination direction and the illumination range) may be determined. In this case, it is preferable that the criteria or the range be changed to correspond to the car speed and/or the acceleration. The reason for this lies in that the vehicle approaches the junction in a variety of manners depending upon the car speed and the like. For example, a method may be employed in which the illumination range is changed at a position distant from the junction to the vehicle in proportion to the speed. Another method is structured in such a manner that the timing of illumination direction changes is advanced when the driving direction is changed. Also, a method may be employed in which the time at which the illumination range is changed is advanced in proportion to the acceleration in the negative direction.

The controlling speed (item (E)) is the changing speed for controlling the illumination direction and the illumination range. It is preferable that the controlling speed be changed to correspond to the car speed and/or the acceleration. That is, when the controlling speed is constant, the change in the illumination control cannot follow the change in the car speed or the like. The control of the controlling speed may be performed by, for example, a method in which the response speed of the operating means 6 is changed. The change is realized by a specific method which varies depending upon the structure of the operating means 6. For example, a change of voltage or an electric current which is supplied to an actuator, or the like, forming the operating means 6, or the pulse width of a control signal or duty cycle enables the speed at which the attitude of the overall light unit or the component of the light unit are changed.

The light distribution (item (F)) is the distribution of luminous intensity on the surface of the road. The light distribution influences the forward visible distance. The light distribution may be controlled by a method in which a state of a specific optical member (for example, a reflecting mirror or a light shielding member) of the light unit is changed. Another method may be employed in which a specific member is selected from a plurality of optical members or a method may be employed in which a proper combination is selected from plural combinations of optical members.

The height of the cut line (item (G)) is a vertical height of a cut line (or a cut off) which determines the boundary between a dark portion and a bright portion realized by light for illumination in the low beam light distribution pattern of a headlight for an automobile. To control the height, a method may be employed in which the overall body of the light unit is inclined in a vertical plane or a method in which a portion of the optical member for forming the light unit is moved. If the height of the cut line is raised excessively, the road user is dazzled. Therefore, it is preferable that a controlled range be limited in such a manner that an upper limit is provided to prevent an excessive height of the cut line.

The controlled range (item (H)) is an angular range from a reference direction to a maximum direction angle. When the illumination range is controlled, the controlled range is an angular range from the reference illumination angle to the maximum illumination angle. When the height of the cut line is controlled, the controlled range is a range from the upper limit height to the lower limit height.

The above-mentioned control which is performed by the illumination control means 4 is performed in accordance with an instruction signal transmitted from an instruction means 8 to the illumination control means 4, as shown in FIG. 1. The instruction means 8 may be realized by an exclusive manual switch or a conventional switch, such as a switch for turning the light unit on or another switch.

FIGS. 7 to 27 show an embodiment of the present invention as applied to a light unit for an automobile.

FIGS. 7 to 26 are diagrams for explaining an illumination control unit using communication between a road and a vehicle.

Figure 7:
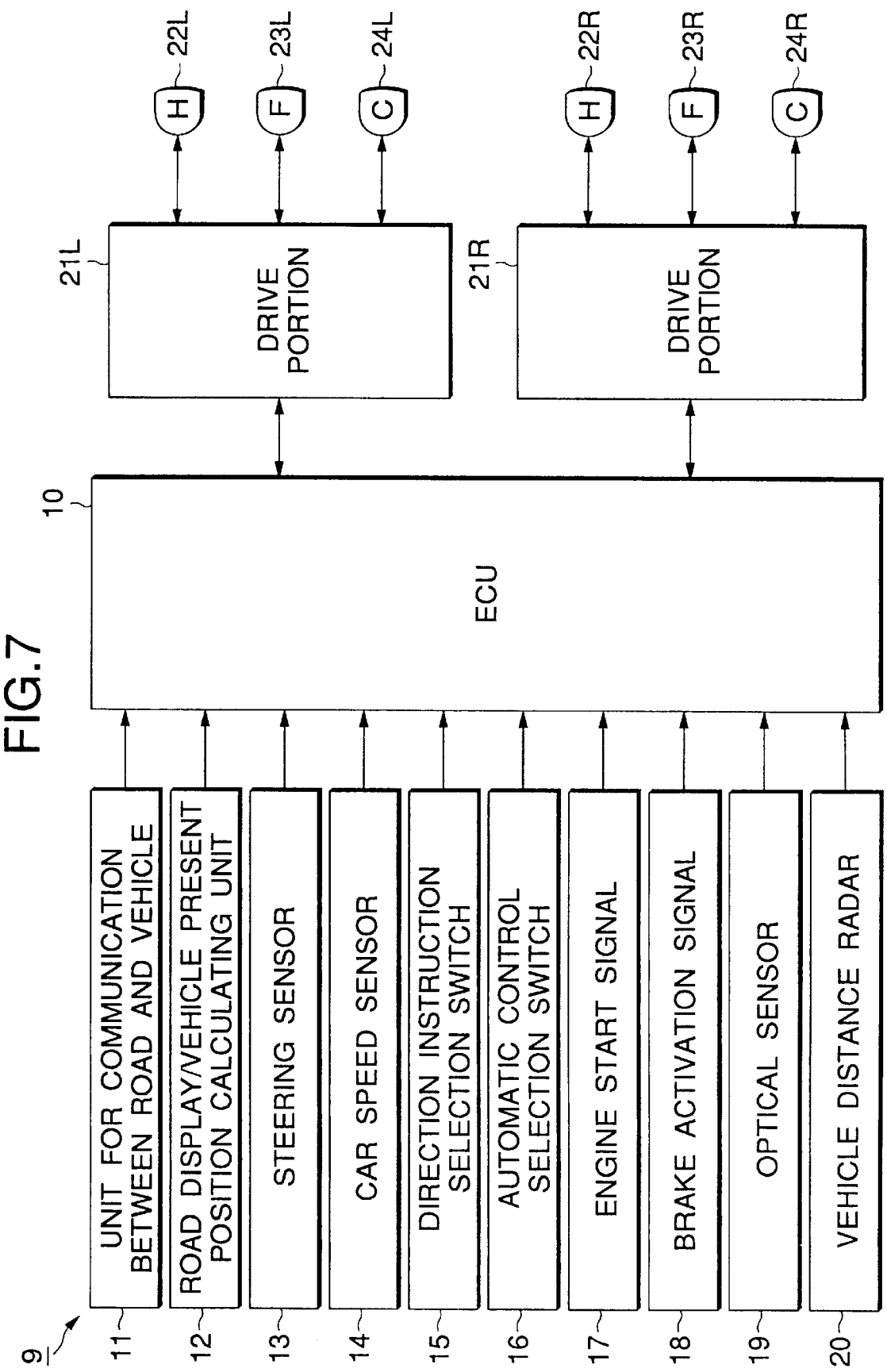
FIG. 7 shows an embodiment of the present invention together with FIGS. 8 to 27 and is a block diagram showing the structure of the unit.

FIG. 7 is a block diagram showing the structure of a unit 9. An ECU (Electronic Control Unit) 10 including a computer has the functions of the mode determining means 3 and the illumination control means 4. The ECU 10 is supplied with signals transmitted from a unit 11 for communication between a road and a vehicle and a road display/present vehicle position calculating unit 12. Moreover, the ECU 10 is supplied with detection signals transmitted from a steering sensor 13 and a car speed sensor 14, signals transmitted from a direction instruction selection switch 15 and an automatic control selection switch 16 and detection signals transmitted from an engine start signal 17, a brake activation signal 18, an optical sensor 19 and a vehicle distance radar 20. Output signals from the ECU 10 are transmitted to drive portions 21L and 21R to control illumination which is performed by each of head lamps 22L and 22R, fog lamps 23L and 23R and cornering lamps 24L and 24. Note that character "L" added to each reference numeral indicates a front left lamp or a portion for controlling the front left lamp. Character "RI" added to each reference numeral indicates a front right lamp or a portion for controlling the front right lamp.

When the ECU 10 is accommodated in the light unit or attached to the light unit from outside, an operation for changing the ECU 10 and the like can easily be performed. As a matter of course, the ECU may be a common ECU disposed in the vehicle.

The unit 11 for communication between a road and a vehicle is arranged to obtain, from the beacons, data of the shape and the structure of the road on which the vehicle is being driven. The road display/present vehicle position calculating unit 12 is used to display the present position of the road, on which the vehicle is being driven, and the vehicle to correct the present position of the vehicle when the vehicle has approached the beacon, and to calculate the present position between the beacons.

The steering sensor 13 is attached to detect the steering direction and the steering angle which is realized when the driver operates the steering wheel. The car speed sensor 14 and direction instruction selection switch 15 may be conventional units for vehicles.

The automatic control selection switch 16 corresponds to the instruction means 8 and has a structure formed by adding a switch for selecting a "mode corresponding to the driving environment" or a "mode which does not correspond to the driving environment" to a three-step lamp switch (off, half light (turning of small lamp and tail light on), and full light). The "mode corresponding to the driving environment" is a mode in which the driving mode is determined to correspond to the driving environment in which the vehicle is driven and control of illumination which is performed by the light unit is performed for each driving mode (including control in which priority is given to the intention of the driver). The "mode which does not correspond to the driving environment" is a mode in which illumination performed by the light unit is controlled by the driver. The latter mode is a mode in which the determination of the driving modes is not performed, or a limited operation, for example, display of the driving mode or an advise to the driver, is performed.

Figure 8:
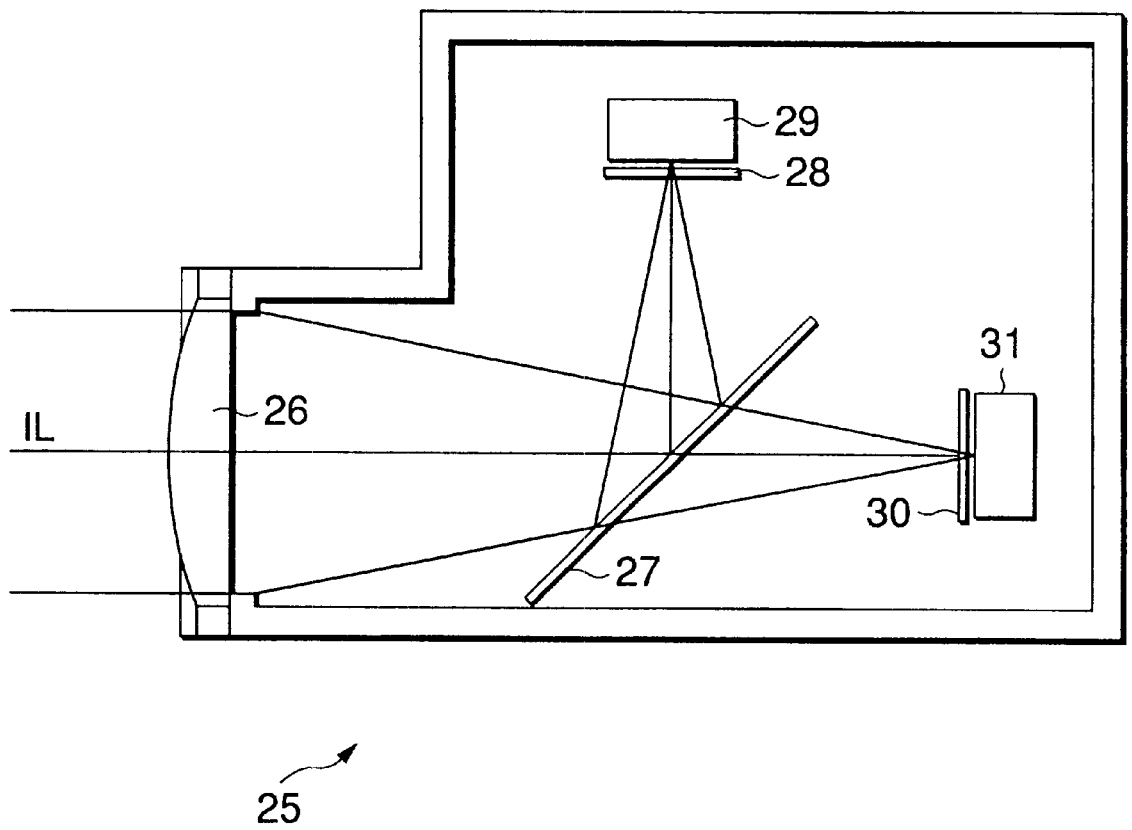
FIG. 8 is a schematic view showing an example of the structure of a unit for detecting an oncoming vehicle and a preceding vehicle.

The optical sensor 19 includes a glare sensor, a luminous intensity sensor, an image pickup sensor (including a solid state image pickup device (a CCD, a MOS area image sensor and the like), an image pickup tube and the like). The optical sensor 19 is used to detect an oncoming vehicle or a preceding vehicle (to detect, for example, the position of the head lamp of an oncoming vehicle or a tail lamp of a preceding vehicle) or the ambient luminous intensity of the vehicle. FIG. 8 schematically shows an example of a detecting unit 25 for detecting an oncoming vehicle or a preceding vehicle. Light IL from a subject which must be detected is allowed to pass through an objective lens 26, and then divided into two sections by a diachronic half mirror 27. Then, either portion (blue light beam) is, through an infrared-ray cutting filter 28, received by a CCD area image sensor 29. Another portion (light beams from which the blue light beam has been omitted) is, through an infrared-ray cutting filter 30, received by a CCD area image sensor 31.

The vehicle distance radar 20 is used to measure the distance between the vehicle and the preceding vehicle, the vehicle distance radar 20 being, for example, a millimeter-wave radar.

Moreover, means for detecting the attitude of the vehicle, such as a car height sensor, a vibration sensor and the like, and means for detecting the driving environment, such as a temperature and humidity sensors, a barometer sensor and the like may be attached.

The unit 9 is arranged in such a manner that the ECU 10 obtains signals from the various sensors when a lamp switch (not shown) is set to a position except for the OFF-position to perform initialization (for example, detection of the reference position of the attitude of the light unit in the drive portions 21L and 21R and a reference position (the zero point) of the steering sensor 13).

The drive portions 21L and 21R have motors for moving the light units and their components, motor drive circuits and detection means for detecting the attitudes of the light units and their components under control of the ECU 10.

In the unit 9, information supplied from the unit 11 for communication between a road and a vehicle, the road display/present vehicle position calculating unit 12, the optical sensor 19 and the vehicle distance radar 20 is used to detect the driving environment. On the other hand, the detection signals supplied from the steering sensor 13 and the car speed sensor 14, the direction instruction signal supplied from the direction instruction selection switch 15, the engine start signal 17 and the brake activation signal 18 are used to predict the vehicle moving direction. Note that the mode determining means 3 and the illumination control means 4 are realized by software in the ECU 10.

The control of the illumination which is performed by the light unit in each mode will now be described in such a manner that driving modes which are determined in accordance with the place in which a vehicle is driven and the traffic density are taken as examples.

The roads are classified into five types including expressways, roads in urban areas, mountain roads and roads in the suburbs. Moreover, the traffic density is classified into a high density and a low density. Thus, classified modes as shown in the following Table 1 are created.

TABLE 1

|  | Expressway | Bypass | Urban Area | Mountain Road | Road in Suburb |
| --- | --- | --- | --- | --- | --- |
| High Density | (1) | (3) | (5) | (7) | (9) |
| Low Density | (2) | (4) | (6) | (8) | (10) |

Note that numerals inside the parentheses indicate mode numbers. When the mode number is an odd number, the traffic density is high. When the mode number is an even number, the traffic density is low (note that the criterion for the traffic density is not required to be a constant value regardless of the mode and criterion set for each mode).

Figure 9:
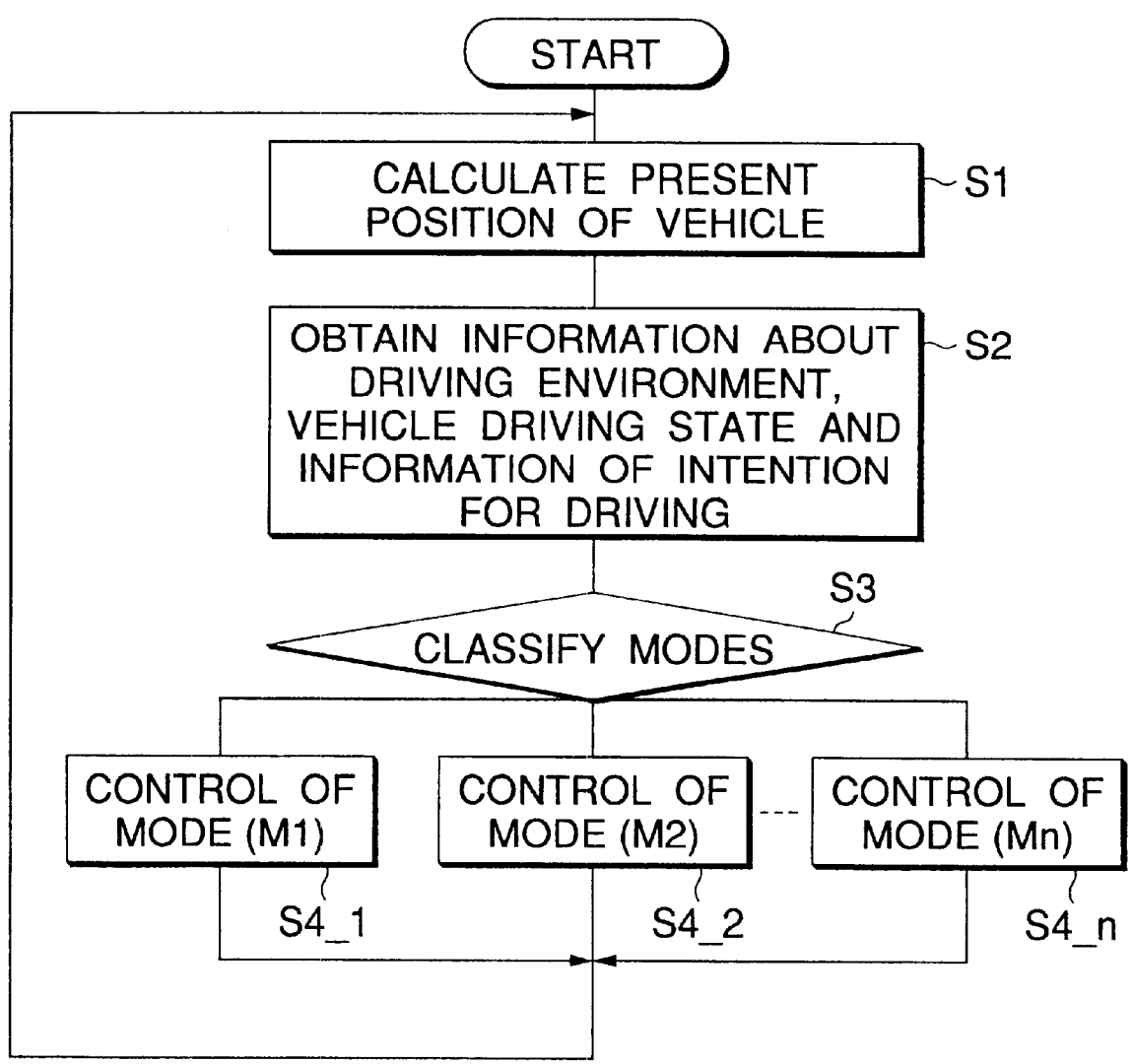
FIG. 9 is a flow chart schematically showing the process which is performed in a driving environment corresponding mode.

FIG. 9 is a flow chart showing an essential portion of a flow of control which is performed by the ECU 10. In step SI calculation of the present position 162 of the vehicle is performed by the road display/present vehicle position calculating unit 12. That is, information about the position of the vehicle is corrected when the vehicle passes through a position near the position at which a beacon is disposed. Moreover, the present position of the vehicle when the vehicle is driven between two beacons is calculated in accordance with the speed and the drive time. If information from the beacon can be obtained by optical communication, information in a narrow area around the beacon can be obtained. Therefore, if information transmitted from the beacon includes information about the position of the beacon, the present position of the vehicle can be obtained within an error of several meters when the vehicle passes by the beacon.

In the next step S2, elapsed time from a moment at which the vehicle has passed by the beacon is measured and information about the driving environment (the vehicle driving state and intention of the driver) is obtained. Information about the driving environment includes the shape, structure and specification/grade of the road and driving region/area obtained when the vehicle has passed by the beacon. Moreover, the information includes the ambient luminous intensity of the vehicle obtained from the optical sensor 19 and whether or not an oncoming vehicle and a preceding vehicle exists and the traffic volume/traffic density obtained from the optical sensor 19 and the vehicle distance radar 20. Information about the vehicle driving state includes the car speed and the acceleration. Information about the intention of the driver includes the direction instruction signal, the detection signal obtained by the steering sensor 13, the engine start signal 17 and the brake activation signal 18.

In step S3, the driving mode of the vehicle is determined to perform control of the illumination in accordance with the determined mode. Thus, the operation is branched to any one of steps S4_1 to S4_N. Note that step S4_i (i=1, 2, ... , n) is a step for performing a process corresponding to a specific mode number (Mi) (i=1, 2, ... , n). Mode number (Mi) includes a tunnel passage mode, to be described later, as well as mode numbers (1) to (10).

Modes (1) to (4) are determined when substantially no pedestrian exists and the driving speed is fast. In accordance with whether a structure for antiglare is provided for the road, the height of the cut line of the head lamp is controlled.

Since a road of the foregoing type usually has antiglare fences or guard rails installed in the median strip thereof, there is substantially no apprehension that the driver of the oncoming vehicle will be dazzled, even if the height of the cut line is somewhat (about 0.5°) raised. Therefore, the distant visibility can be improved because the cut line is raised. Thus, the safety at night can be improved.

Figure 10:
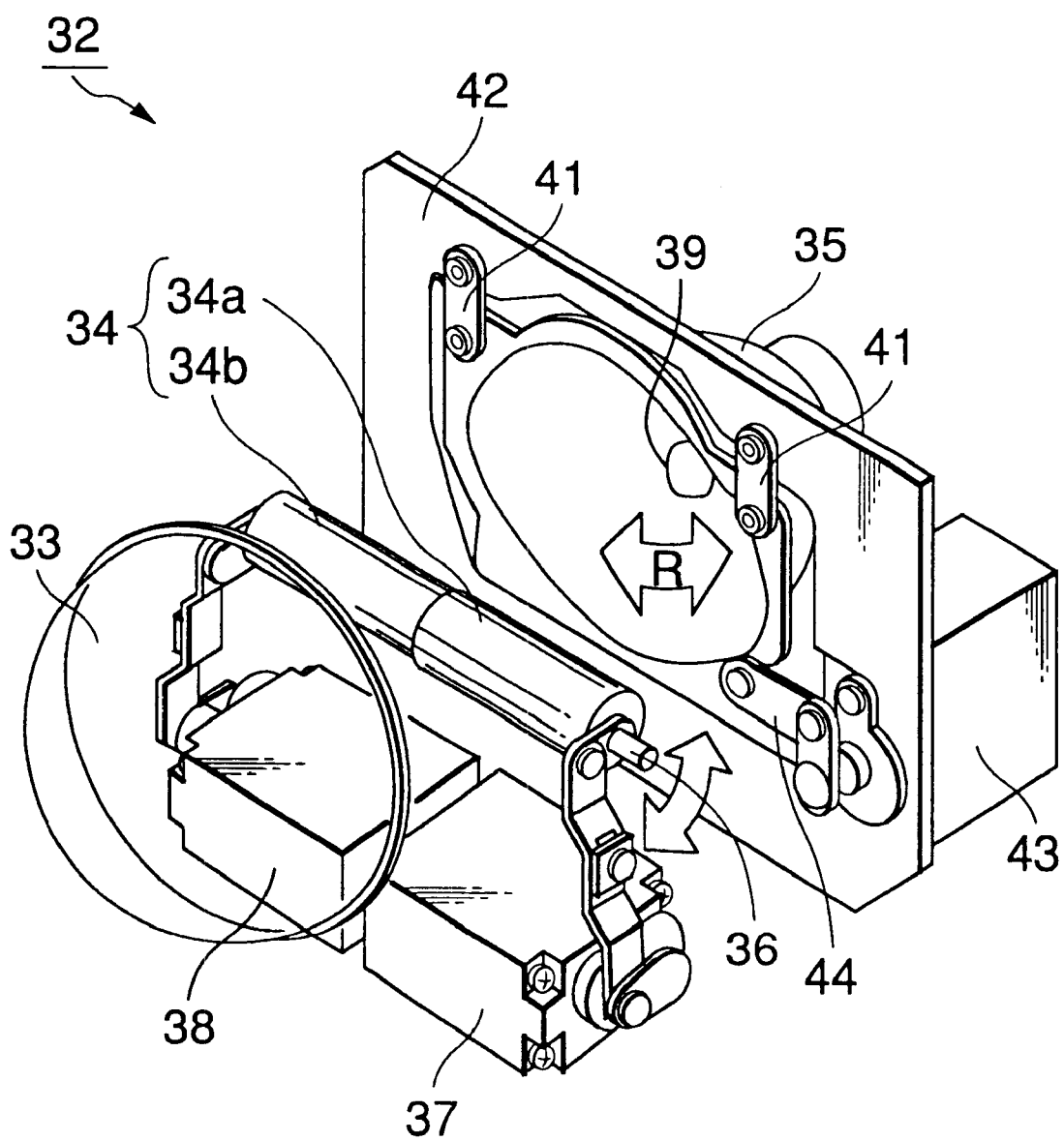
FIG. 10 is a perspective view showing an essential portion of an example of the structure of the lamp.

FIG. 10 shows an example of the structure of head lamp for a low beam which is a so-called projector-type lamp.

The lamp 32 has a projecting lens 33, a shade 34 and a reflecting mirror 35, the shade 34 and the reflecting mirror 35 being movable members. That is, the shade 34 is composed of a columnar portion 34a for determining the cut line of the light distribution pattern for the own lane and a columnar portion 34b for determining the cut line for the oncoming vehicle lane. Eccentric rotational shafts 36 (one of the shafts is illustrated) projecting over the side surfaces of the columnar portions at positions which are eccentric from the central axes of the columnar portions are rotated by actuators 37 and 38. Thus, the height of the cut line can be determined. Note that the light source 39 is secured to the reflecting mirror 35 in such a manner that a light emitting portion of the light source 39 is positioned on an optical axis in a recess of the reflecting mirror 35.

Figure 11:
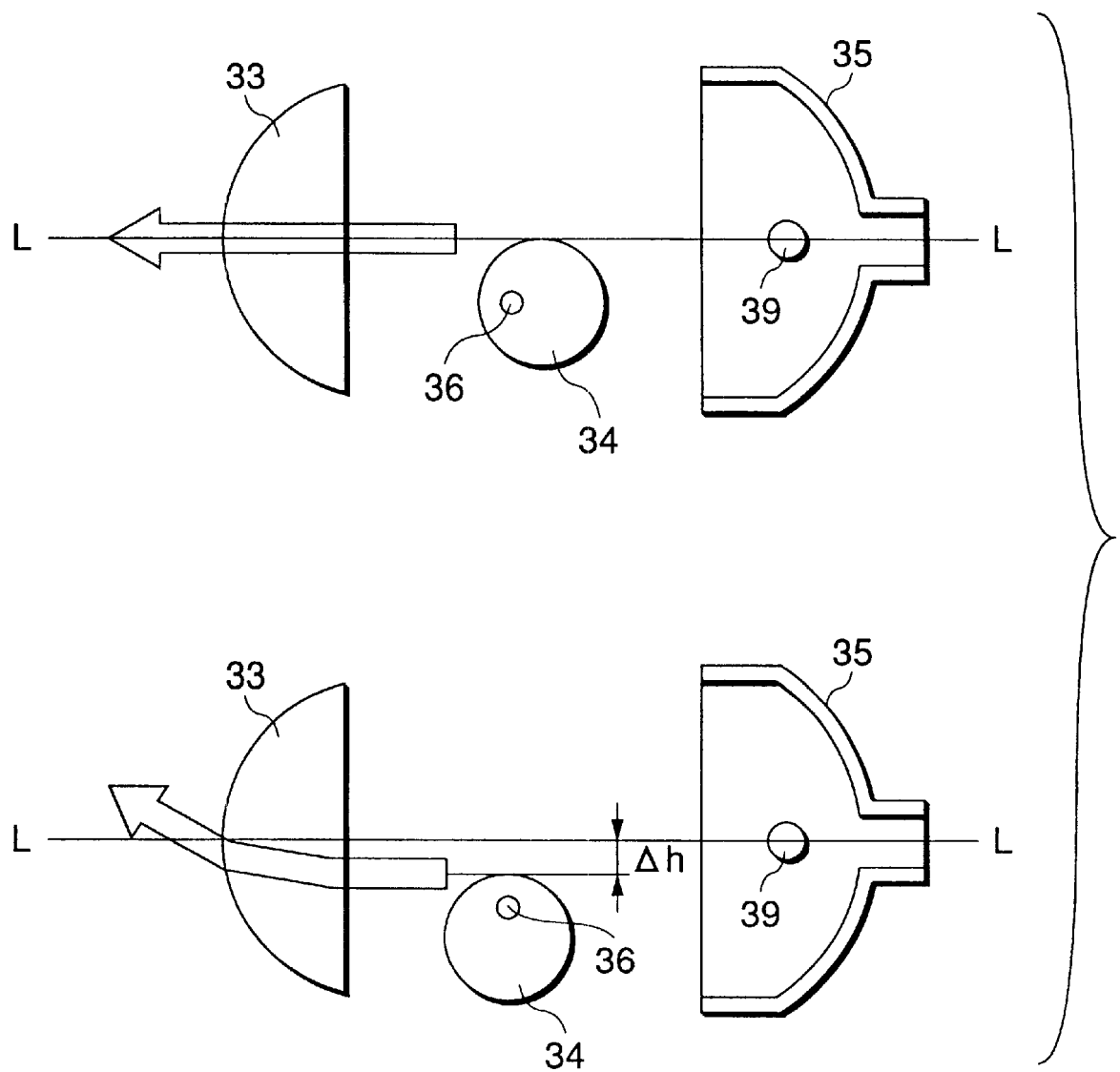
FIG. 11 is a schematic view for explaining height control of a cut line of the lamp shown in FIG. 10.

FIG. 11 is a side view showing the operating principle of the foregoing. In the upper drawing, the upper end of the shade 34 substantially coincides with main optical axis L—L of the optical system including the projecting lens 33, the reflecting mirror 35 and the light source 39. When the upper end of the shade 34 is brought to a position below the main optical axis L—L (symbols "Δh", indicates the amount of displacement of the upper end of the shade with respect to the horizontal plane including the main optical axis L—L) as a result of the rotation of the shade 34, the height of the cut line is raised as compared with the case shown in the upper drawing (attention must be paid to inversion of an image caused by the projecting lens 33). Note that a thick arrow in the drawing schematically indicates the direction of illumination.

Figure 12:
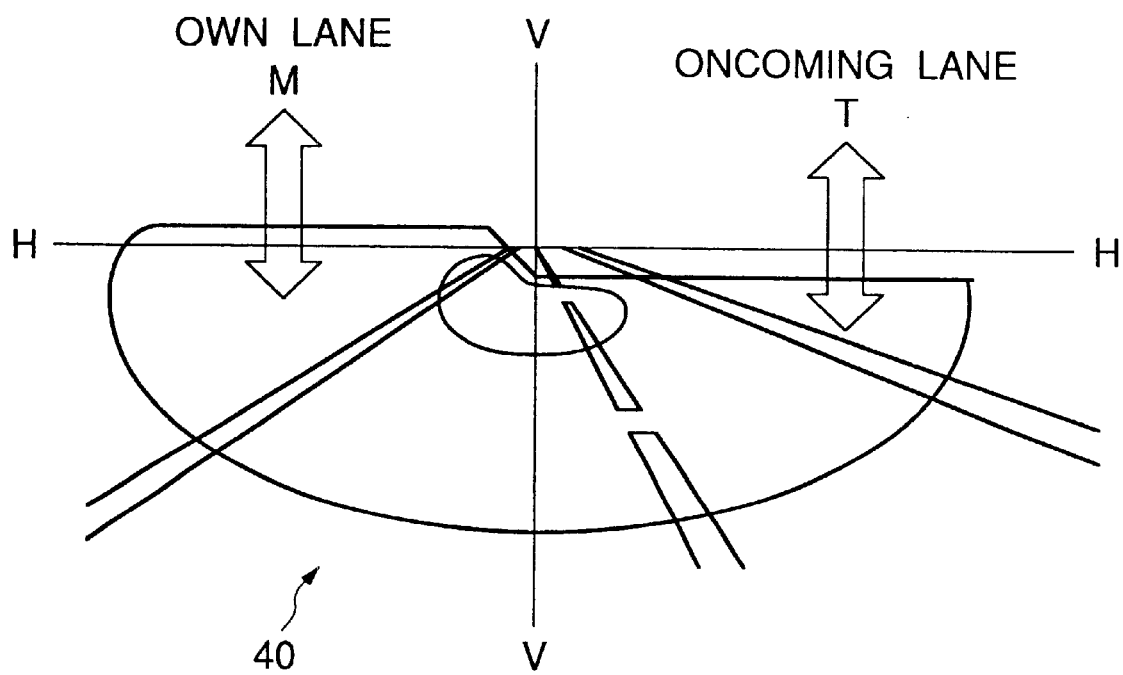
FIG. 12 is a schematic view showing a light distribution pattern and the surface of a road when a vehicle which is being driven straight is viewed from a forward position.

FIG. 12 shows both light distribution pattern 40 of the lamp 32 and the surface of the road in front of the vehicle which is being driven straight (in the case where the vehicle must be driven on the left hand side of the road). The top end of the columnar portion 34b determines the height of the cut line of the oncoming vehicle lane in the light distribution pattern 40 in the vertical direction indicated by an arrow T. The top end of the columnar portion 34a determines the height of the cut line for the own vehicle lane in the light distribution pattern in the vertical direction indicated by an arrow M.

As shown in FIG. 10, the reflecting mirror 35 has a portion adjacent to the top end thereof which is secured to a support member 42 of the reflecting mirror 35 through parallel links 41. Moreover, the reflecting mirror 35 can be rotated in a direction indicated by an arrow R shown in FIG. 10 by an L-shape rotative link 44 arranged between an actuator 43 secured to the support member 42 and the reflecting mirror 35.

When antiglare fences are installed, control is performed in such a manner that the cut line is made to be somewhat higher than a standard height, as described above. When the foregoing control is performed, existence of a preceding vehicle must be considered. If a preceding vehicle exists, there is apprehension that a problem of glare for the driver of the preceding vehicle arises when the cut line for the own lane is raised. Therefore, existence and position of the preceding vehicle and the distance to the preceding vehicle must be detected by the vehicle distance radar 20 or the optical sensor 19 to control the height of the cut line in such a manner that the driver of the preceding vehicle is not dazzled.

Figure 13:
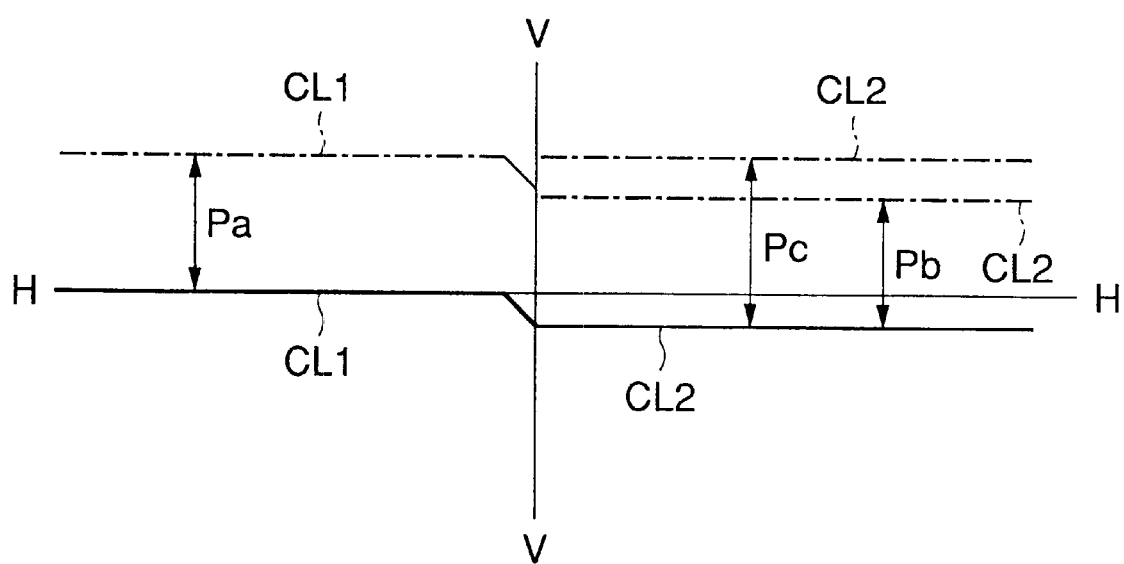
FIG. 13 is a diagram for explaining control of the height of the cut line for the own vehicle lane and the oncoming vehicle lane.

FIG. 13 is a diagram showing an example of control of the height of the cut line. In nations and areas in which vehicles must be driven on the left hand side to conform to the road traffic act, the height of cut line CL1 of the low beam distribution pattern positioned to the left of vertical line V—V, that is, the height of the cut line for the own vehicle lane substantially coincides with the horizontal line H—H as indicated by a solid line shown in FIG. 13. On the other hand, the height of cut line CL2 positioned to the right of the vertical line V—V, that is, the height of the cut line for the oncoming vehicle lane is positioned somewhat lower than the horizontal line H—H and arranged to extend horizontally, as indicated by a solid line shown in FIG. 13.

When the heights of the cut lines CL1 and CL2 are used as references, control of the cut line CL1 for the own vehicle lane is performed in accordance with a result of detection performed by each of the optical sensor 19 and the vehicle distance radar 20. That is, the distance from the vehicle to the preceding vehicle and whether or not an oncoming vehicle exists are detected. In accordance with results of detection, the height of the cut line CL1 is controlled in range Pa from the reference height to an upper limit (a position indicated by an alternate long and short dash line shown in FIG. 13).

The cut line CL2 for the oncoming vehicle lane is controlled in accordance with information supplied from the optical sensor 19 and the unit 11 for communication between a road and a vehicle. The reason for this lies in that the driver cannot easily identify the oncoming vehicle if light emitted from the oncoming vehicle to the own vehicle is intermittently interrupted by the antiglare fences when the vehicle is driven on a road having the antiglare fences in the median strip of the road in a case where the optical sensor 19 is provided on an interior mirror or a position adjacent to the interior mirror. In the foregoing case, the cut line can be raised to the horizontal line H—H or a position near the horizontal line H—H when the antiglare fences are low. If the antiglare fences are high, the cut line CL2 can be, as indicated by an alternate long and short dash line shown in FIG. 13, raised to a position higher than the horizontal line H—H and somewhat lower than the upper height of the cut line CL1 (refer to range Pb shown in FIG. 13).

That is, the height of the cut line CL2 for the oncoming vehicle lane is determined in accordance with the antiglare fences provided for the median strip of the road. If the vehicle is driven on a road having no median strip and no oncoming vehicle, or if light emitted from an oncoming vehicle to the own vehicle is not intermitted in a case where the road has a median strip, another control may be performed. That is, the height of the cut line CL2 may be included in range Pc between maximum height (substantially the same height as the maximum height of the cut line CL1) indicated with an alternate long and two short dashes line shown in FIG. 13 and the reference height for the cut line CL2.

When the traffic density of the road is high, there is apprehension that a multiplicity of drivers of preceding vehicles are dazzled when the height of the cut line is changed. Therefore, it is preferable that the height of the cut line is fixed to a reference value to prevent glare.

Figure 14:
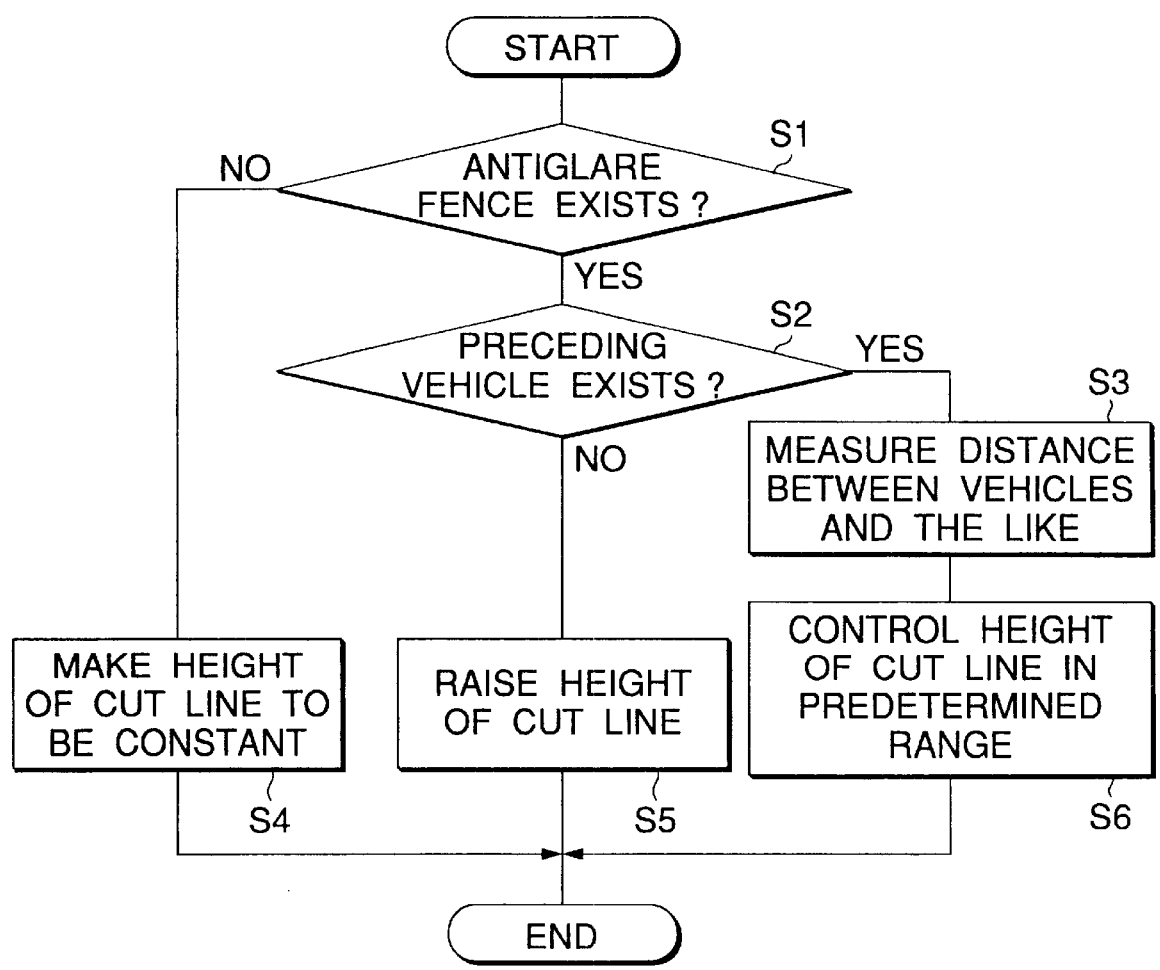
FIG. 14 is a flow chart showing the process which is performed in a mode in which the vehicle is driven on an expressway.

FIG. 14 is a flow chart simply showing processes for modes (1) to (4). In step S1, whether or not an antiglare fences exist is detected. If no antiglare fences exist, the operation proceeds to step S4 so that the heights of the cut lines CL1 and CL2 are made to be constant with respect to a reference height. If the antiglare fences exist, whether or not a preceding vehicle exists is detected in step S2. If no preceding vehicle exist, the operation proceeds to step S5 so that the height of the cut line is raised to its upper limit. If a preceding vehicle exists, the operation proceeds to step S3 so that the distance from the own vehicle to the preceding vehicle or the position of the tail lamp of the preceding vehicle is measured. Then, the operation proceeds to step S6 so that the height of the cut line is controlled in such a manner that the driver of the preceding vehicle is not dazzled.

In modes (5) and (6), the driving speed is not considerably high, the traffic density is high and a multiplicity of pedestrians and intersections exist in general. In this case, it is important to accurately recognize pedestrians and obstacles so that the near users of the road are not dazzled.

Accordingly, the following illumination control is performed in the foregoing modes:

(1) enlargement of the illumination range by using side illumination; and (2) control using information about the shape and structure of the road.

Figure 15:
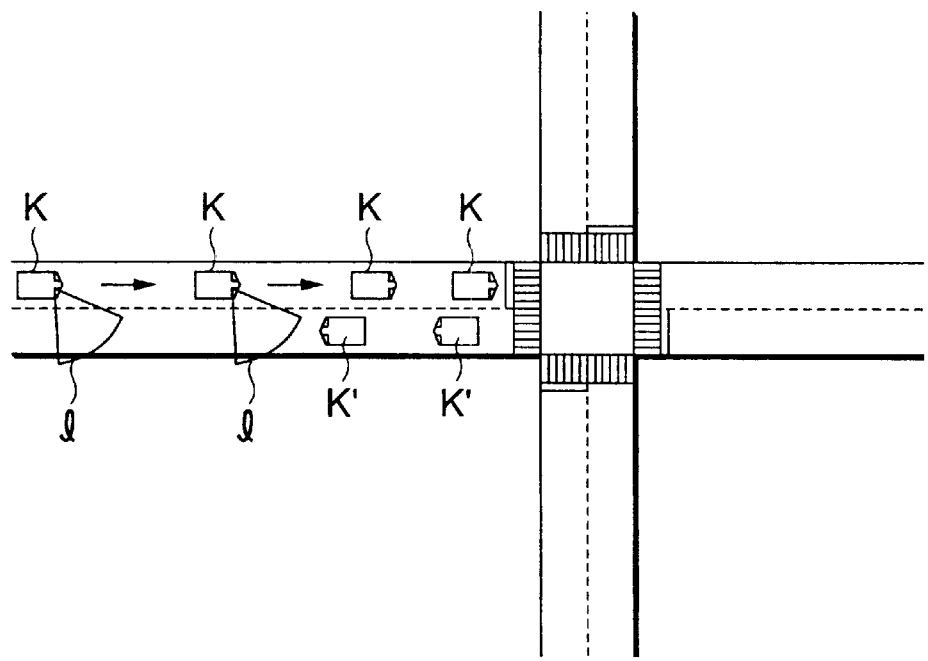
FIG. 15 is a diagram for explaining control of illumination which is performed when the vehicle has approached an intersection together with FIGS. 16 and 17 and is a view of explanatory showing side illumination.

Control (1) is performed in a case where the traffic density is higher than a predetermined criterion or an oncoming vehicle exists though the traffic density is low. As shown in FIG. 15, light 1 for illumination emitted from lamps (cornering lamps or the like) secured to the side surface of the car body adjacent to the oncoming vehicle lane is used to illuminate the surface of the road adjacent to the oncoming vehicle lane. Thus, the driver of the oncoming vehicle K' is able to observe pedestrians or the like from a distance greater than the visible distance obtainable from the head lamps provided for the oncoming vehicle. Therefore, the safety for the other vehicles can be improved as well as the own vehicle. The quantity of light for illumination of the cornering lamp is enlarged as the own vehicle approaches the intersection. Thus, the pedestrians and the like can easily be recognized.

Control (2) is performed when information about the shape and structure of the road, and in particular, information about a intersection is obtained. The ranges of the illumination which is performed by the head lamps, fog lamps and cornering lamps are combined with one another to determine the illumination range. Moreover, the quantity of light for illumination is changed in accordance with the distance from the vehicle to the junction or in accordance with time obtained by dividing the foregoing distance by the car speed.

A vehicle having head lamps and cornering lamps has an arrangement such that the position of the central intensity of light of the light distribution pattern of the head lamp and the position of the central intensity of light of the light distribution pattern of the cornering lamp are somewhat distant from each other in the horizontal direction. Therefore, the foregoing vehicle has a tendency that the brightness of a position between the two light distribution patterns is relatively reduced. If time at which the cornering lamp is turned on is synchronized with time at which the direction indicator (the turn signal lamp) is turned on, there is apprehension that the users of the road are shocked in a case where the cornering lamp is suddenly turned on in accordance with the direction instruction signal. If the cornering lamp is turned on at a position sufficiently distant from the intersection or the like, the users of the road are dazzled and the power consumption is enlarged excessively.

Figure 16:
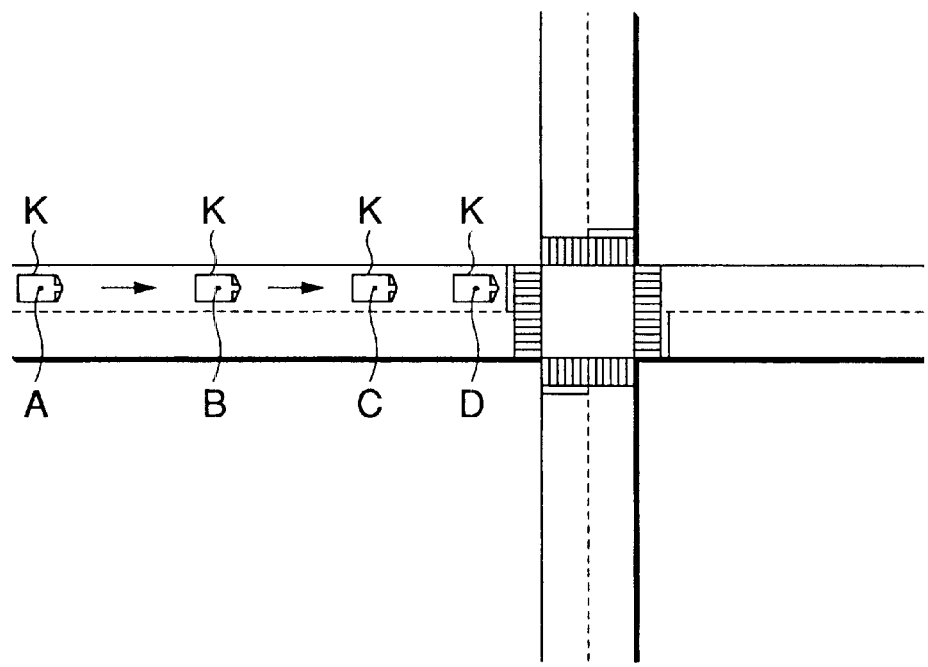
FIG. 16 is a diagram showing the position of the vehicle with respect to an intersection.

Accordingly, the position of the central intensity of light of the light distribution pattern of the fog lamp is brought to a position between the position of the central intensity of light of the light distribution pattern of the head lamp and the position of the central intensity of light of the light distribution pattern of the cornering lamp. Moreover, when vehicle K has approached the intersection and existence of the intersection has been detected at position A in accordance with information from the unit 11 for communication between a road and a vehicle, as shown in FIG. 16, time at which the vehicle K will reach the intersection is predicted. Then, the quantities of light for illumination which is emitted from the pair of the fog lamps for side illumination are reduced at position B which is several seconds before the approach. As the vehicle approaches the intersection, the quantities of light from the fog lamps are gradually enlarged so that the illumination is performed in such a manner that the pedestrians and the like on the road in front of the intersection can easily be confirmed. Note that the foregoing control of the quantity of light for illumination may be performed in such a manner that the increasing ratio of the quantity of light is changed in accordance with the car speed or acceleration or the amount of operation of the brake pedal or the accelerator pedal.

The fog lamps are controlled in such a manner that the quantities of light are maximum at point C in front of the intersection for a predetermined distance.

The cornering lamp is turned on when the vehicle has approached the intersection more closer than the time at which the fog lamps are turned on. In general, only one of the right and left cornering lamps is turned on (the lamp disposed in the direction into which the vehicle will be turned).

In the mode corresponding to the driving environment, the cornering lamp is turned on after the direction instruction signal has been transmitted. If no intersection exists within a predetermined distance in the moving direction or the vehicle is sufficiently distant from the intersection, it is preferable that the cornering lamp is not turned on or the quantity of light from the same is reduced.

After the vehicle K has passed through the intersection, the cornering lamp and the fog lamps are turned off or the quantities of light are reduced after which the lamps are turned off in this sequential order.

If a multiplicity of intersections exist at short intervals in the vehicle moving direction, it is preferable that the quantity of light for illumination remain constant, rather than performing the control of the quantity of light for illumination in view of preventing questionability from the users of the road.

When the vehicle is stopped at the intersection, in particularly when the vehicle is stopped immediately before the stop line, it is preferable that the quantities of light emitted from the head lamps are reduced or the head lamps are turned off or the height of the cornering lamp is reduced by using the low beam. The reason for this lies in that the users of the road adjacent to the intersection must be protected from being dazzled.

Figure 17:
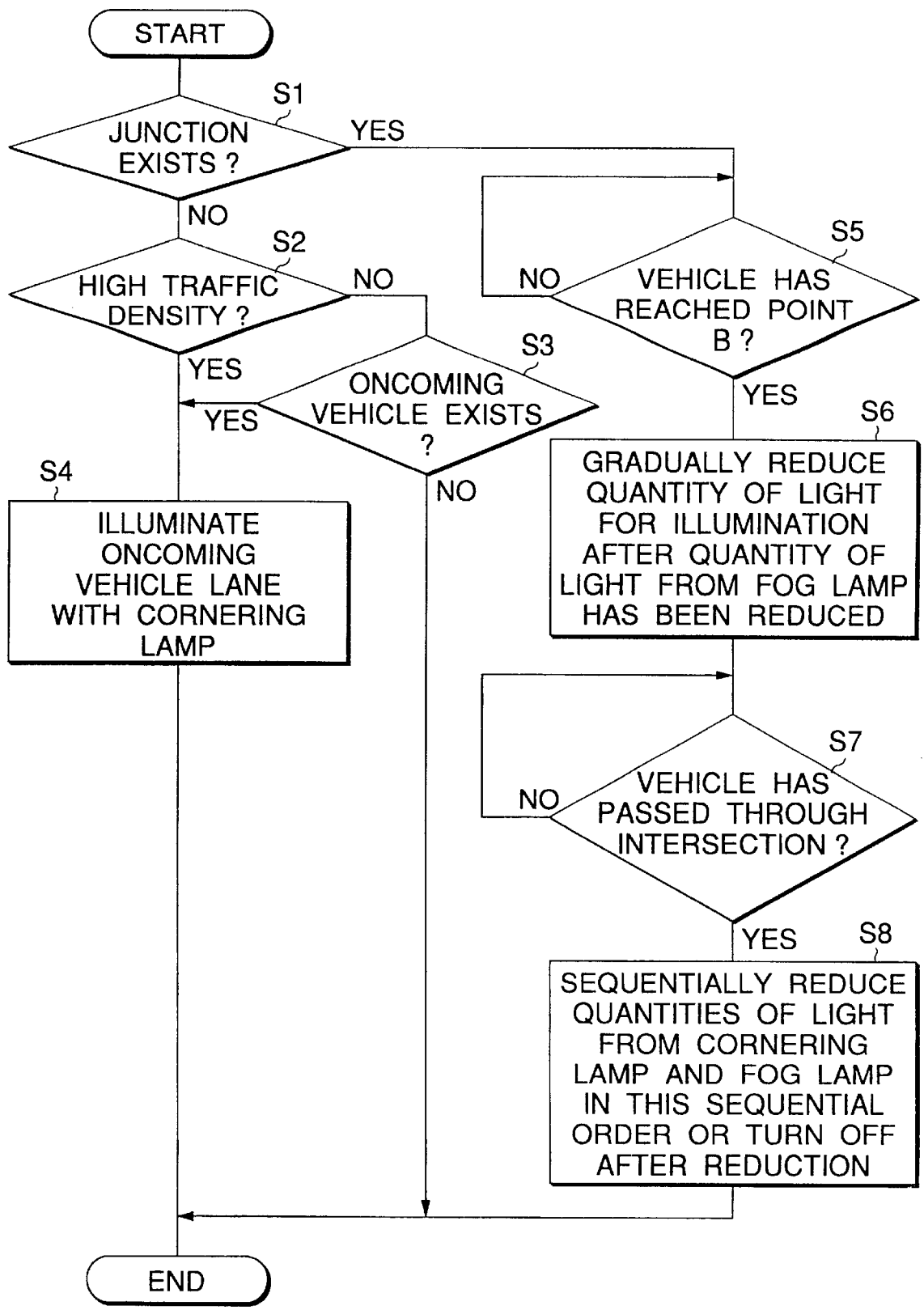
FIG. 17 is a flow chart showing a process for controlling illumination.

FIG. 17 is a flow chart showing the process to perform the above-mentioned controls (1) and (2). In step S1, whether or not a junction exists is determined. If the road has a junction in the vehicle moving direction, the operation proceeds to step S5. If the road has no junction in the vehicle moving direction, the operation proceeds to step S2 so that the traffic density is detected.

If the traffic density is high in step S2, the operation proceeds to step S4. In a negative case, the operation proceeds to step S3 so that whether or not a oncoming vehicle exists is determined. If an oncoming vehicle exists, the operation proceeds to step S4. If no oncoming vehicle exists, the operation is ended.

In step S4 the surface of the oncoming vehicle lane is illuminated with light which is emitted from the cornering lamp as described above.

If a junction exists in the vehicle moving direction in step S1, whether or not the vehicle has reached the point B shown in FIG. 16 is determined in step S5. If the vehicle has reached the point B, the quantity of light for illumination which is emitted from the fog lamps is reduced in step S6. Then, the quantity of light for illumination is increased as the vehicle approaches the junction. In step S7 whether or not the vehicle has passed through the intersection is determined. After the vehicle has passed through the intersection, the quantity of light which is emitted from the cornering lamp and the fog lamps is, in this sequential order, reduced or the lamps are turned off after the reduction, in step S8.

If the vehicle is not provided with the cornering lamps and provided with only the head lamps and the fog lamp, a fog lamp 23R is, for example, composed of a light source 45, a reflecting mirror 46, an outer lens 47 for covering an opening of the reflecting mirror 46 and an inner lens 48 disposed to be movable in a space in the light unit from the reflecting mirror 46 and the It outer lens 47. Moreover, the inner lens 48 is moved by a drive mechanism 49 in a direction indicated by an arrow I shown in FIG. 18. Thus, the degree of diffusion of light for illumination in the horizontal direction can be controlled in accordance with the relative positional relationship among lens steps 48a provided for the inner lens 48 and lens steps 47a provided for the outer lens 47. As a result, the light distribution patterns shown in FIGS. 5 and 6 can be obtained.

Modes (7) to (10) are determined when the frequency of driving on curved roads is high. Since the driver usually drives on inexperienced roads, there is apprehension that a serious accident takes place if the obstacles on the road and the shape of the road are insufficiently recognized. Therefore, the light unit is controlled to follow the shape of the road.

In accordance with information supplied from, for example, the unit 11 for communication between a road and a vehicle and the road display/present vehicle position calculating unit 12 to the ECU 10, information about the shape and structure of the road ahead from the position of the vehicle for a predetermined distance (for example, a value obtained by multiplying the car speed with predetermined time) is obtained. In accordance with information above, direction of illumination and range of light for illumination emitted from the light unit are controlled.

Figure 19:
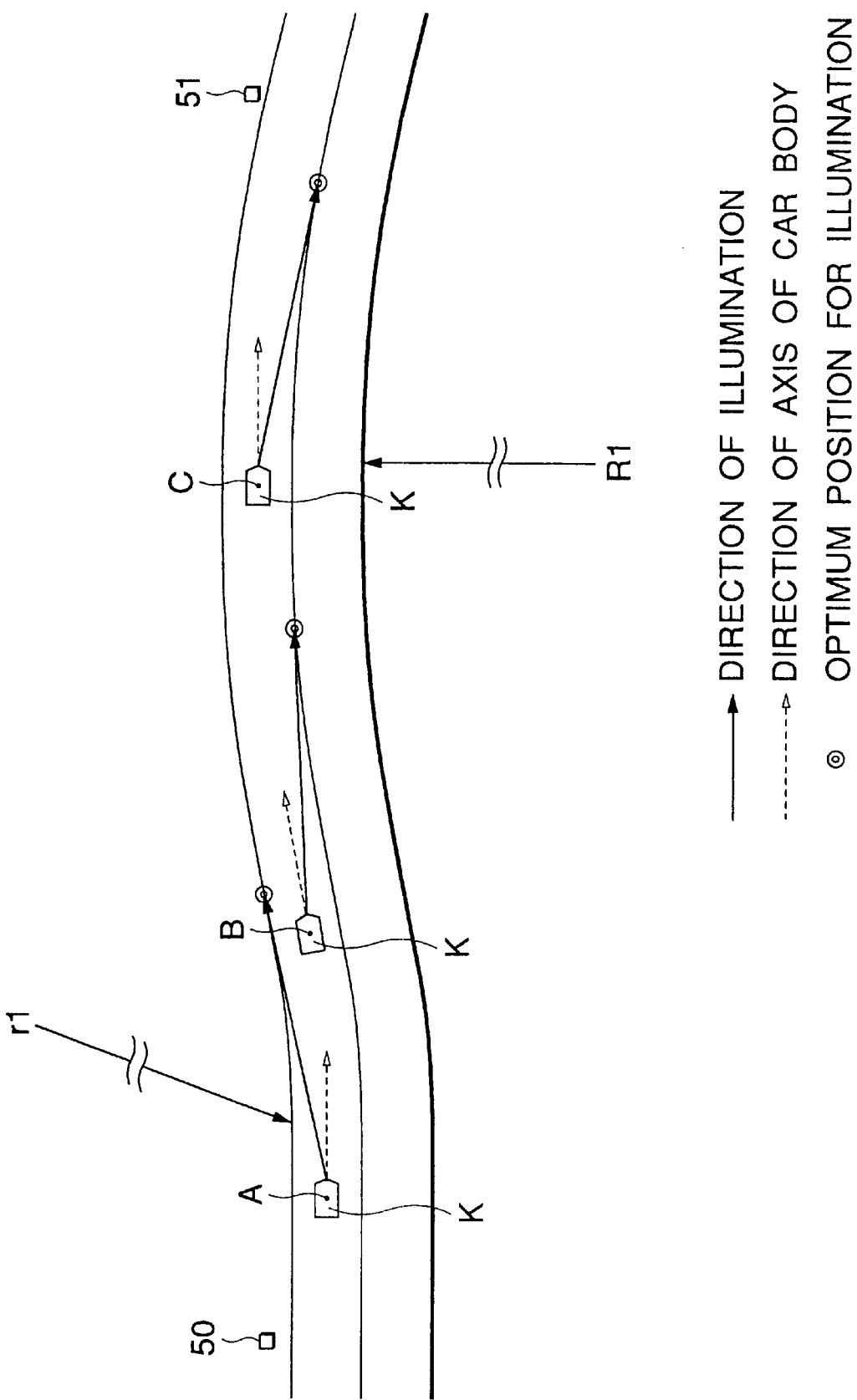
FIG. 19 is a diagram showing control of illumination which is performed by the light unit when the vehicle is driven on a curved road.

In FIG. 19 vehicle K is driven on a curved road provided with a beacon 50 disposed in front of a curve and another beacon 51 disposed at the end of the curve and having curvature radii r1 and R1. In accordance with information about the shape of the road, time elapsed from passage of the vehicle by the beacon 50, the car speed, the position of the vehicle in a region from the beacon 50 to the beacon 51 and the moving direction are sequentially determined. In accordance with the car speed, the optimum illumination position on the road in front of the vehicle is determined. Thus, the illumination direction from the head lamp is controlled. An arrow in the form of a dashed line shown in FIG. 19 indicates the direction of the axis of the car body. The position in the form of a double circle indicates the optimum illumination position. An arrow in the form of a solid line drawn from the front portion of the vehicle toward the double circle indicates the direction of illumination with light which is emitted from the head lamps.

In general, a driver attempts to recognize the road in front of the present position of the vehicle for a predetermined time (which is called "t1" seconds). The time t1 is elongated as the car speed is raised. The turning circle and the car speed of the vehicle have the relationship approximating a proportional relationship. Thus, the driving speed is reduced on a curved road having a small turning circle.

Therefore, the distance of illumination is made to be a distance which is obtained by multiplying the speed per second with the t1 seconds. Moreover, the left hand shoulder of the road is illuminated with light when the curve is turned to the left as shown at point A of FIG. 19. When the curve is turned to the right as shown at point C, the right hand shoulder of the road is illuminated with light. Moreover, a direction opposite to the shoulder of the road is illuminated with light at a position in front of the turning point of the curved road as shown at point B. The foregoing control of the direction enables light for illumination to be controlled to be adaptable to the characteristic of the movement of the line of sight of the driver. As a result, driving safety is improved.

The control of the illumination direction will now be described in such a manner that a case using the lamp shown in FIG. 10 is taken as an example. The reflecting mirror 35 is translated by the actuator 37 in a plane perpendicular to the main optical axis of the light unit so that the direction of illumination is changed.

Figure 20:
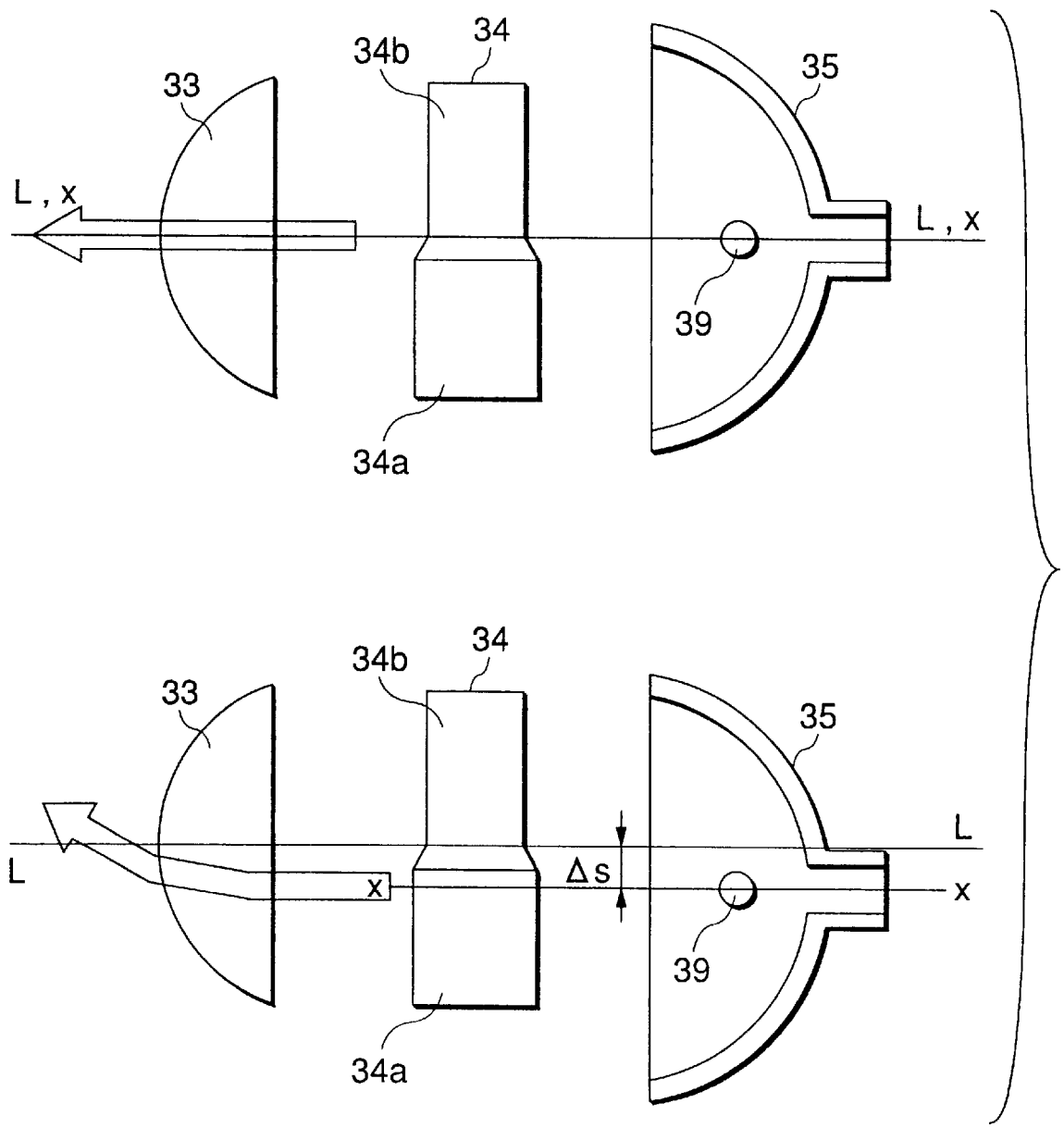
FIG. 20 is a diagram showing control of illumination which is performed by the lamp shown in FIG. 10 in the horizontal direction.
Figure 21:
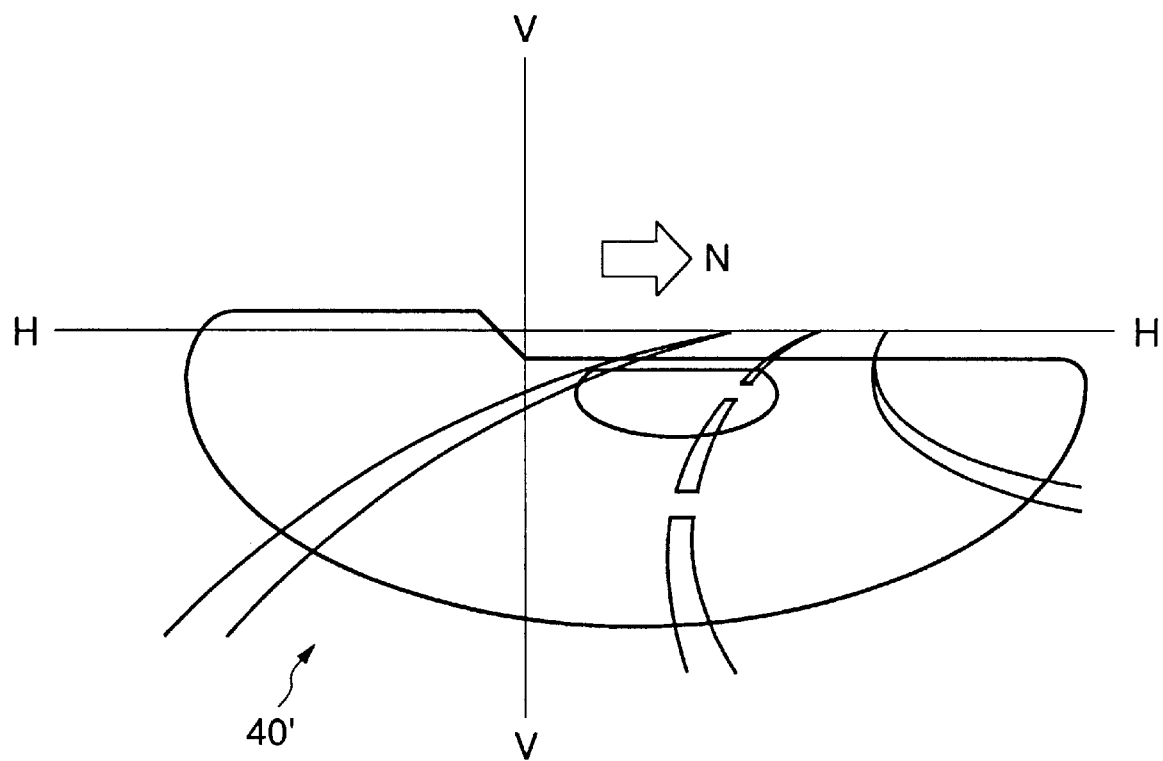
FIG. 21 is a schematic view showing a light distribution pattern and the surface of a road when the vehicle, which is being driven on a right curve, is viewed from a forward position.

FIG. 20 is a plan view showing the above-mentioned translational movement. In the upper drawing, main optical axis L—L of the optical system including the shade 34, the projecting lens 33 and the reflecting mirror 35 coincides with optical axis x—x of the reflecting mirror 35. Therefore, the direction of illumination faces forwards. When the translation of the reflecting mirror 35 has caused the optical axis x—x of the reflecting mirror 35 to be shifted in parallel with respect to the main optical axis L—L (the displacement is indicated with "Δs", shown in FIG. 20), the direction of illumination is shifted to the right or left. Therefore, when the vehicle is driven on a curve turned to the right as shown in FIG. 21, the surface of the road in the direction into which the vehicle will be turned can be illuminated with light of light distribution pattern 40' in which the central luminous intensity is, as indicated with an arrow N, shifted to the right.

Figure 18:
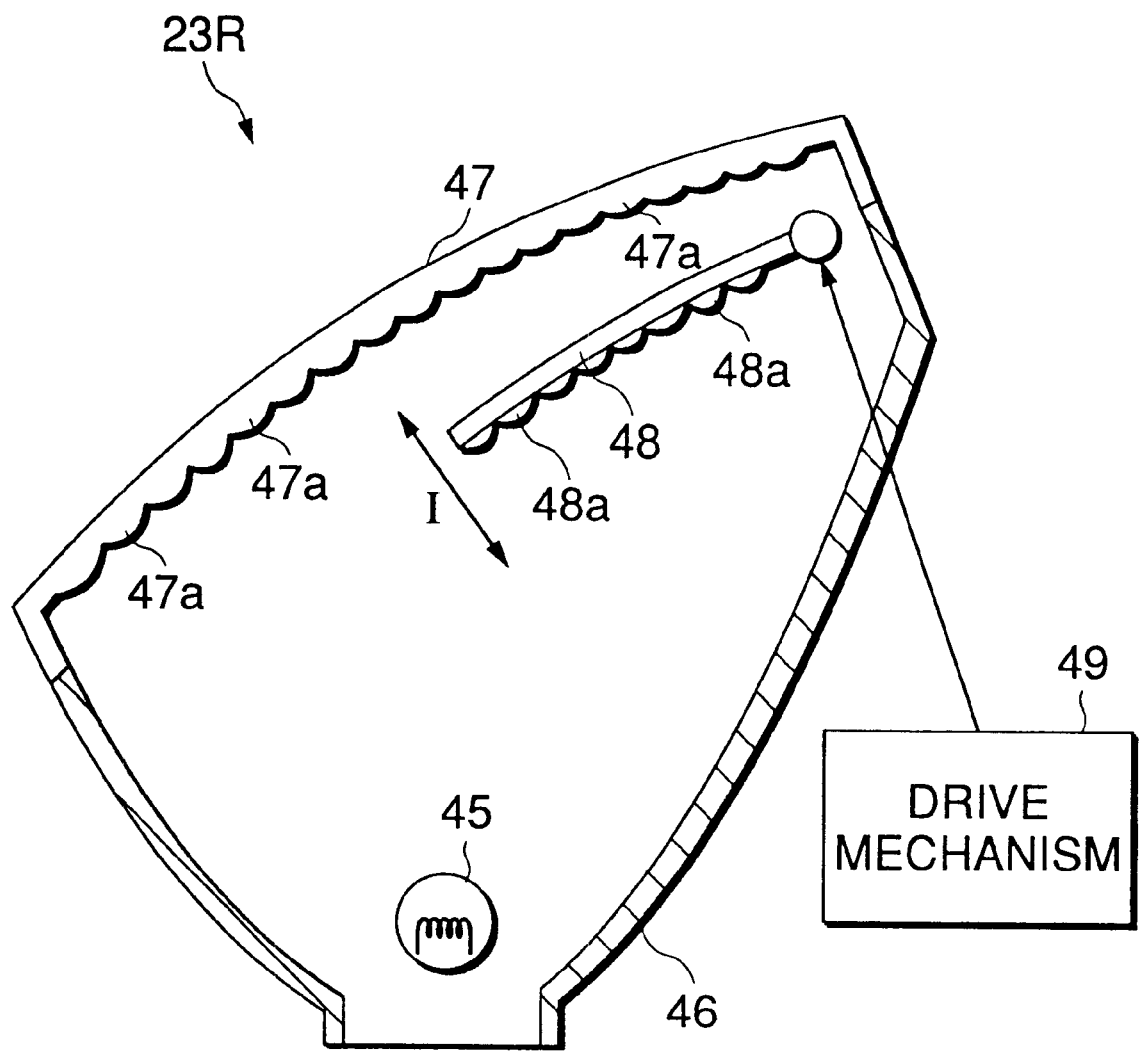
FIG. 18 is a horizontal cross sectional view showing an example of the structure of the fog lamp.

In a case where the illumination with light which is emitted from the fog lamps shown in FIG. 18 is controlled when the vehicle is driven on a curved road, the movement of the inner lens 48 is controlled to correspond to the car speed. That is, when the car speed is high, it is preferable that concentrated control (see FIG. 5) of the light distribution pattern is performed to improve the visibility in the forward direction of the vehicle. If the car speed is low, it is preferable that diffusion control (see FIG. 6) of the light distribution pattern is performed to improve the visibility in the side direction of the vehicle.

The foregoing control of the illumination range may be performed in such a manner that the same state is realized by the right and left lamps. As an alternative to this, the right and left lamps may be controlled individually. When the degrees of diffusion of the illumination ranges realized by the right and left lamps are made to be substantially the same, driving can easily be performed in general when slalom driving is performed.

When the vehicle is driven on a straight road, the fog lamps are turned off. When a curved road is detected by the unit 11 for communication between a road and a vehicle, the fog lamps are turned on in a reduced light quantity state. When the vehicle approaches the curve, the quantity of light which is emitted from the lamp in the direction in which the vehicle will be turned or the quantities of light from both of the lamps are increased. Thus, electric power can be saved.

In addition to the above-mentioned arrangement, the controlled range for the height of the cut line for each of the head lamps and the fog lamps is adjusted to be adaptable to the traffic density and the shape of the road (refer to factor (H)). Thus, the load which must be borne by the actuator for use to control the cut line can be reduced. If the traffic density is low, it is preferable that the controlled range be widened. If the vehicle is driven on a road in an urban area, it is preferable that the controlled range be reduced.

The tunnel passage mode will now be described.

In this mode, information supplied from the unit 11 for communication between a road and a vehicle, the road display/present vehicle position calculating unit 12, the optical sensor 19 and the car speed sensor 14 is received by the ECU 10 so as to be processed. Information supplied from the unit 11 for communication between a road and a vehicle is sampled at a frequency of several times per minute. Information from the optical sensor 19 and the car speed sensor 14 is sampled at a frequency of several to tens times per second. Note that the sampling cycle may be a constant value or the same may be varied to correspond to the car speed. Information supplied from the unit 11 for communication between a road and a vehicle is processed in consideration of the intervals of the installed beacons.

Data about the ambient driving environment, in which the vehicle is driven and which is detected by the optical sensor 19, is subjected to a movement averaging process together with data obtained within predetermined time so as to be stored in a memory in the ECU 10. Note that the movement averaging process includes a simple averaging process and a weighted averaging process. The period of time which is subjected to the averaging process may be a predetermined period of time or the same may be varied to correspond to the car speed or the like.

Figure 22:
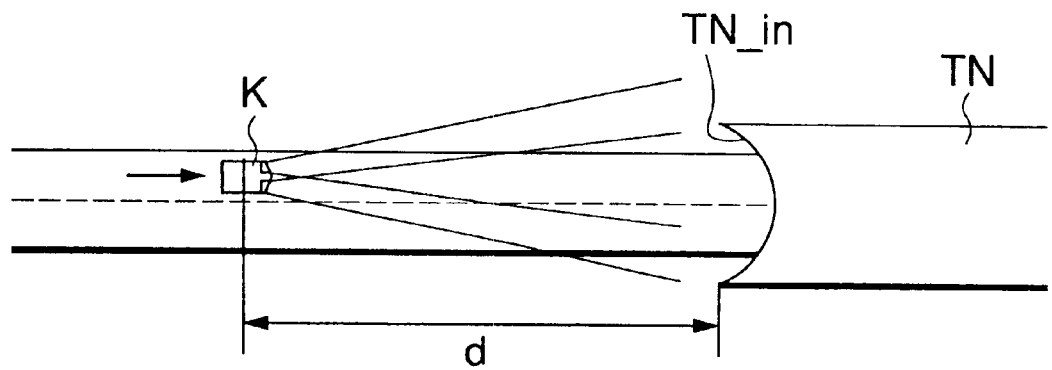
FIG. 22 is a diagram showing control of illumination which is performed by the light unit when the vehicle is driven through a tunnel together with FIGS. 23 and 24 and is a diagram showing a state where the vehicle has approached to a position in front of the tunnel.

FIG. 22 shows a state where the vehicle K is being driven on a road in front of which a tunnel TN is formed. The present position of the vehicle is in front of the tunnel TN for a distance d. In the foregoing case, the head lamps and the like are turned on at a position in front of the tunnel and prediction is made that the vehicle will reach the entrance TN_in of the tunnel TN after driving for predetermined time (several seconds).

When the vehicle is being driven in the tunnel and the vehicle does not emerge from the tunnel after the vehicle has been driven for a distance (a product of the car speed and predetermined time) for a predetermined time (several seconds) from the present position, the head lamps and the like are continuously turned on.

Figure 23:
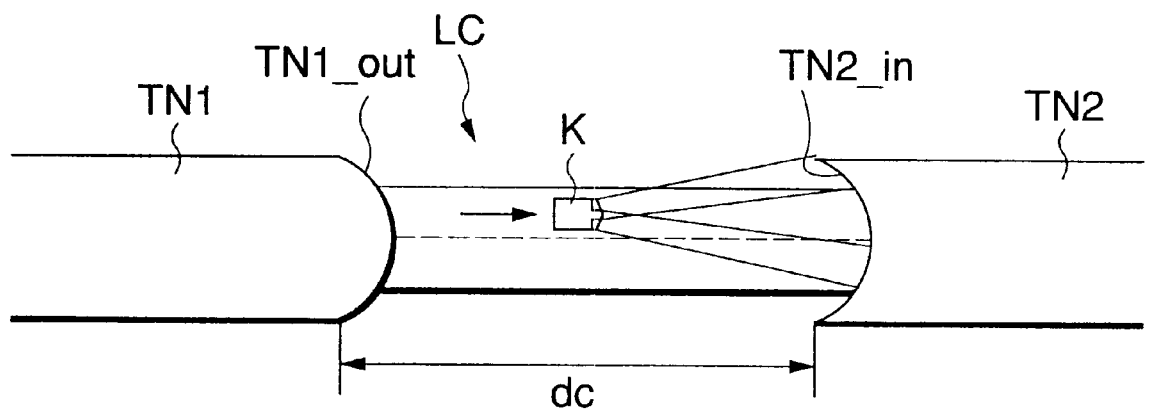
FIG. 23 is a diagram showing a state in which the vehicle is being driven on a road at an intermittent opening of a tunnel.

FIG. 23 shows a situation in which a tunnel TN is sectioned into tunnels TN1 and TN2 by an intermittent opening LC (or a situation in which the vehicle is driven between two tunnels). If the time for the vehicle K to pass through the intermittent opening LC is shorter than a predetermined time, the head lamps and the like are continuously turned on. That is, if time obtained by dividing the length dc of the intermittent opening LC with the present car speed is shorter than a criterion when the vehicle K has reached the position in front of the end TN1_out of the tunnel TN1, the head lamps and the like are continuously turned on also in the period in which the vehicle K is driven through the intermittent opening LC. In the ECU 10, a reference to past averaged ambient luminous intensity is made. Moreover, data about the luminous g intensity obtained in a period of driving through the intermittent opening LC is omitted from the averaging process.

Figure 24:
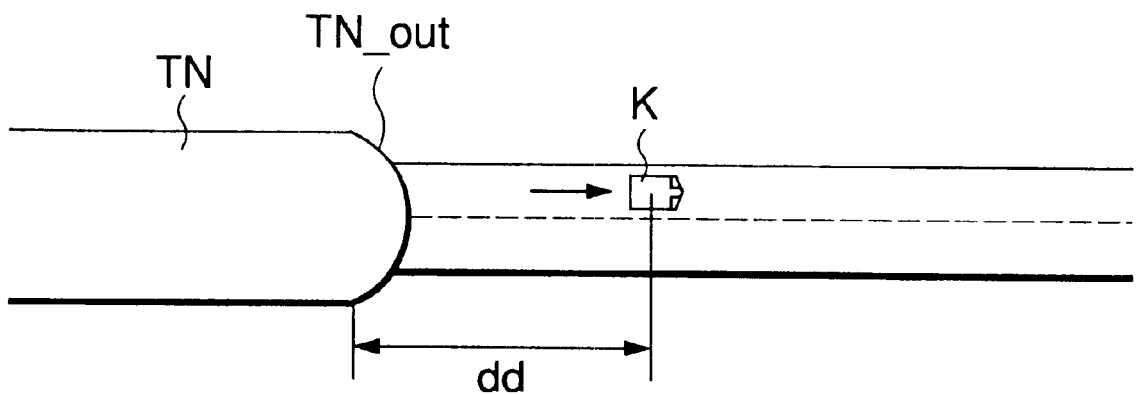
FIG. 24 is a diagram showing a state in which the vehicle has passed through the tunnel.

FIG. 24 shows a state in which the vehicle K is being driven at a position distant from the end TN_out of the tunnel TN for a distance dd after the vehicle has emerged from the tunnel TN. After the vehicle has been driven for a predetermined time or distance from the end TN_out or for a distance corresponding to the car speed, the head lamps and the like are turned off or the quantities of light are reduced after which the lamps are turned off.

Figure 26:
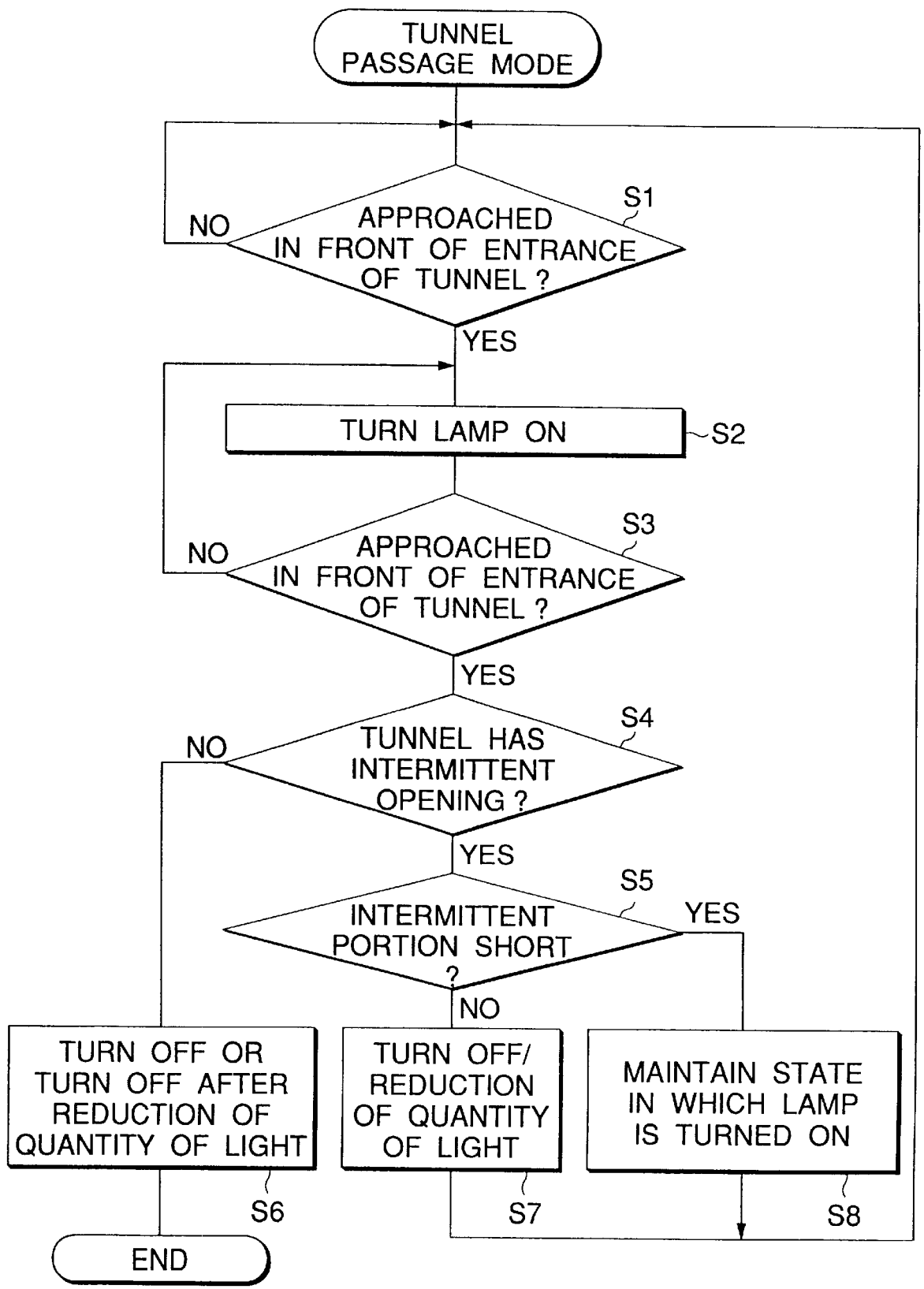
FIG. 26 is a flow chart showing a process of control of illumination which is performed when the vehicle is driven in a tunnel.

FIG. 26 is a flow chart showing the flow of a process which is performed in the tunnel passage mode.

In step S1, whether or not the vehicle K has reached a predetermined position in front of the mouth of the tunnel TN is determined. If the vehicle has reached the predetermined position, the head lamps and the like are turned on in step S2. In step S3, whether or not the vehicle K has reached a predetermined position in front of the end of the tunnel TN is determined. If the vehicle has reached the predetermined position, the operation proceeds to step S4. If a negative case, the operation is returned to step S2 so that the state in which the lamps are turned on is maintained.

In step S4, whether or not the tunnel TN has the intermittent opening LC is determined. If the intermittent opening is formed, the operation proceeds to step S5. If no intermittent opening is formed, the operation proceeds to step S6.

In step S5, the length dc of the intermittent opening LC of the tunnel TN is calculated. In accordance with the length of time obtained by dividing the foregoing distance with the car speed, the length of the intermittent opening is determined in relation to the car speed. If the intermittent opening is long, the operation proceeds to step S7. If the intermittent opening is short, the operation proceeds to step S8.

In step S6, the head lamps and the like are turned off or the quantities of light from the same are reduced after which the lamps are turned off after the vehicle has been driven for a predetermined distance or time after emergence from the tunnel. Then, the tunnel passage mode is ended.

In step S7, the head lamps and the like are turned off or the quantities of light from the same are reduced after the vehicle has been driven for a predetermined distance or time after emergence from the tunnel. Then, the driving mode in the tunnel passage mode is maintained, and then the operation is returned to step S1.

In step S8, the state in which the head lamps and the like are turned on is maintained even in a period in which the vehicle is emerged from the tunnel and driven through the intermittent opening LC. Then, the tunnel passage mode is maintained, and then the operation is returned to step S1.

The control of illumination which is performed in the driving mode which is determined when a bridge structure exists in the vehicle moving direction will now be described.

A case is considered in which a bridge structure, such as a footbridge or a multilevel intersection, exists within a driving region from the present position of the vehicle to a predetermined distance or predetermined time. In this case, an output denoting the detected ambient luminous intensity from the optical sensor 19 is changed considerably (that is, the luminous intensity is considerably changed when the vehicle is driven below the bridge) after the vehicle has passed below the bridge structure. Therefore, it is preferable that the luminous intensity detected in the foregoing driving region be omitted from the calculations for obtaining the average value. The reason for this is considered. If the rapid change in the luminous intensity exerts a great influence upon the average luminous intensity as described above, there is apprehension that the lamps are erroneously turned on because the average luminous intensity is lower than a criterion with which the lamps are turned on/off.

Figure 25:
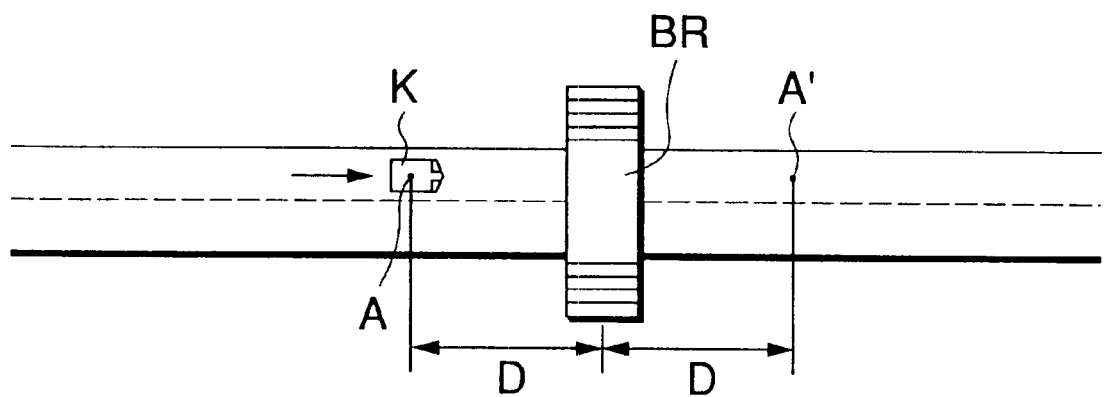
FIG. 25 is a diagram showing the relationship between the vehicle and a bridge structure.

Setting of the driving region for a predetermined distance or time with respect to the present position of the vehicle will now be described. For example, as shown in FIG. 25, a position which is apart for a distance which is two times the distance D from bridge structure BR and the vehicle K predicted in accordance with information supplied from the unit 11 for communication between a road and a vehicle, that is, the present position of the vehicle K is assumed to be "A". Moreover, a position opposite to the position A across the bridge structure BR is assumed to be "A'". In the foregoing case, a detected luminous intensity (or a detected value smaller than a predetermined criterion) which is included in a region (distance 2·D) from the position A and the position A' and in which the change in the luminous intensity exceeds a predetermined range is omitted from the calculations for obtaining the average value.

The control of illumination which is performed in a mode which is determined when the vehicle is started or stopped will now be described.

In a start mode in which the vehicle is started, detection of the ambient luminous intensity with the optical sensor 19 is carried out after the engine has been started even if the driving environment corresponding mode has not been selected by using the automatic control selection switch 16 when the engine of the vehicle has been started. Whether or not the engine has been started is detected in accordance with whether or not the ignition position has been selected by using the key switch or by detecting the number of revolutions of the engine. The average ambient luminous intensity realized immediately after the engine has been started is set to be a value which exceeds a criterion with which whether or not the lamps are turned on or off is determined. Thus, lamps are not turned off in the foregoing case. If the average ambient luminous intensity is smaller than the criterion for determining whether or not the lamps are turned on or off, the lamps are turned on. If the head lamps and the like are automatically turned on or off, it is preferable that the tail lamps and the like are synchronously turned on or off.

In a period until the present position of the vehicle has been determined, control is performed by the ECU 10 in such a manner that turning of the lamps on/off by making a reference to information supplied from the unit 11 for communication between a road and a vehicle is inhibited. If the present position of the vehicle has been determined and the vehicle is being driven on a road included in information on the road map, the lamps are controlled to be turned on/off while a reference is made to information about the shape of the road on which the vehicle is being driven and the like. If the vehicle is being driven in a range outside the range in which the communication between the road and the vehicle is permitted or if the vehicle is driven to the outside of the road included in information on the road map, the control to turn the lamps on/off is performed in accordance with the average ambient luminous intensity. The latter case is a case in which the vehicle is being driven in a sky parking or a case in which the vehicle is being driven on a new road or the like.

In the stop mode in which the driven vehicle is stopped in a state where its engine is being operated, whether the lamps are turned on or off is determined in accordance with the average ambient luminous intensity if no bridge structure exists in a predetermined range in front and in the rear of the present position of the vehicle. If a bridge structure exists in the predetermined range in front and in the rear of the present position of the vehicle, the state realized when the vehicle has been stopped that the lamps are turned on or off is maintained until predetermined time elapses. Then, the time period of sampling for detecting the ambient luminous intensity which is performed by the optical sensor 19 is extended. That is, sampling of the luminous intensity is performed at intervals of, for example, several minutes to tens of minutes.

Although the structure using the communication between the road and the vehicle has been described, an apparatus using the GPS satellite communication in place of the communication between the road and the vehicle may be formed.

Figure 27:
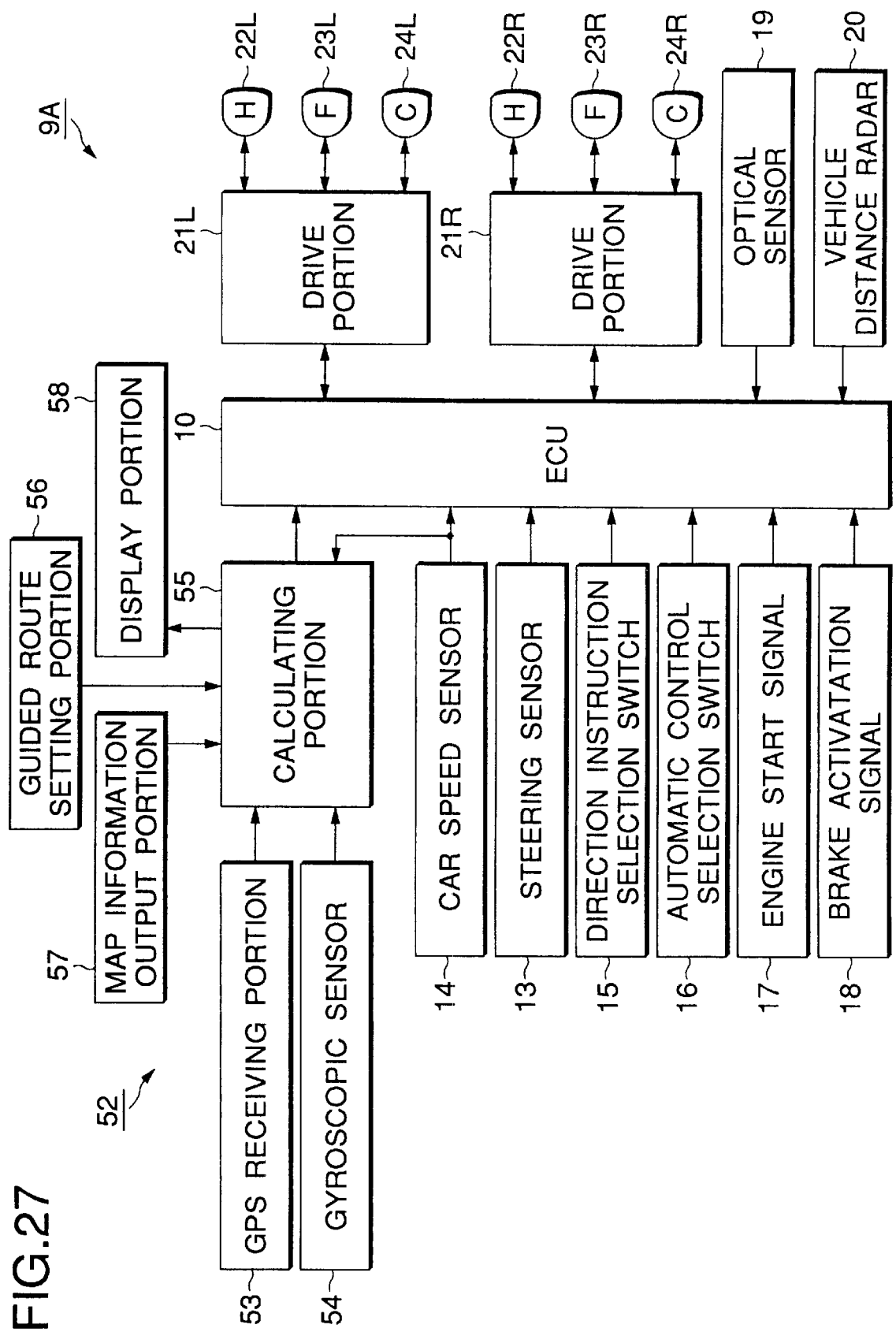
FIG. 27 is a block diagram showing the structure of a unit using GPS satellite communication.

In an illumination control unit 9A shown in FIG. 27, the ECU 10 of the unit is supplied with an output from a GPS navigation unit 52.

The GPS navigation unit 52 forming the driving-environment detecting means 2 comprises a GPS receiving portion 53, a gyroscopic sensor 54, a calculating portion 55, a guided-route setting portion 56, a map-information output portion 57 and a display portion 58. In accordance with detection signals supplied from the gyroscopic sensor 54 and the car speed sensor 14 to the calculating portion 55, the movement of the vehicle is detected. In accordance with radio waves supplied from the GPS satellite and received by the GPS receiving portion 53, an accurate present position of the vehicle is calculated. The calculated present position and data about the road obtained from the map-information output portion 57 are displayed on the display portion 58.

The GPS navigation unit 52 has a function capable of guiding the driver along a planned course while displaying the planned course together with information on the road map on the display portion 58. The planned course includes a shortest distance course or a shortest time course from the present position of the vehicle to a destination or a course selected in accordance with another input information item (the telephone number or address of the destination) or instructed information or information stored as a result of leaning. Thus, the GPS navigation unit 52 is able to perform required setting by using the guided-route setting portion 56.

The GPS navigation unit 52 transmits, to the ECU 10, information about the shape of the road and information about the present position of the vehicle.

The ECU 10 performs a process similar to the process which is performed by the unit shown in FIG. 7. However, the process is different from that shown in FIG. 9 which is the flow chart in that the portion for obtaining information by the communication between the road and the vehicle must be changed to be adaptable to the method employed by the GPS navigation unit 52 to obtain information. Moreover, the difference is that the ECU 10 controls the illumination with the lamps while making a reference to a planned course for the vehicle set by the guided-route setting portion 56 (see information (g)).

That is, if a planned course has been provided for guiding the route, the vehicle moving direction is predicted while a reference to the planned course and the vehicle moving direction is made. If the vehicle is being driven on the planned course, the control of the illumination which is performed by the lamps is performed to be adaptable to the planned course. If the vehicle is deviated from the planned course, control of illumination which is performed by the lamps is performed to be adaptable to the vehicle moving direction predicted in accordance with the direction instruction signal, the steering-angle detected signal and the car-speed detected signal.

In the tunnel passage mode, the ECU 10 receives information supplied from the GPS navigation unit 52, the optical sensor 19 and the car speed sensor 14 to sir process information above. Information supplied from the GPS navigation unit 52 is sampled at a frequency of several to some hundreds of times per minute. Information supplied from the optical sensor 19 and that from the car speed sensor 14 are sampled at a frequency of several to tens of times per second. The sampling cycle may be a constant value or the same may be varied to correspond to the car speed. It is preferable that information supplied from the GPS navigation unit 52 be sampled by the latter method (that is, the sampling cycle is shortened because the driving environment is changed considerably in proportion to the car speed) to efficiently process data.

The movement averaging process for the ambient luminous intensity will now be described. The ECU 10 calculates an average value (which is assumed to be "Mc") in predetermined time from the present time (which is assumed to be "tc") to a predetermined past time (which is assumed to be "T") and an average value (which is assumed to be "Mb") in a period from time tb=tc−T to the time in reverse chronological order by time T. In accordance with a situation, a reference to either of the average values is made. That is, a basic process is performed in such a manner that Mc is subjected to a comparison with a predetermined criterion or a predetermined range. In accordance with a result of the comparison, the time at which the lamps are turned on or off and the quantity of light for illumination are controlled. When the vehicle is driven through a tunnel having an intermittent opening as shown in FIG. 23 or when the vehicle is driven below a bridge as shown in FIG. 25, luminous intensity obtained during the period of passage is ignored. As an alternative to this, Mb is employed as the average luminous intensity.

As can be understood from the foregoing description, according to the aspect claimed in claim 1, the driving mode of the vehicle is determined in accordance with the driving environment for the vehicle. Moreover, the illumination which is performed by the light unit for a vehicle is controlled in each driving mode which is changed when the driving environment is changed. Thus, excessively sensitive response of the control of the illumination which is performed by the light unit to change in the driving environment can be prevented. Moreover, delay in the control can be prevented. Thus, the load which must be borne by the drive portion for the light unit can be reduced. Moreover, safety of driving at night can be improved.

According to the aspect claimed in claim 2, information including the shape and structure of a road and present position of the vehicle is detected and the path for driving is monitored in accordance with image information supplied from the image pickup means for photographing the path so that change in the driving environment for the vehicle is accurately recognized.

According to the aspect claimed in claim 3, an oncoming vehicle or a preceding vehicle is detected to detect the traffic volume or the traffic density on the own lane or an oncoming vehicle lane. Thus, control of illumination which is performed by the light unit can appropriately be performed to be adaptable to the state of the traffic.

According to the aspect claimed in claim 4, the class or the type of the path including a driving area or a driving region is determined in accordance with information supplied from the driving-environment detecting means to determine the driving mode of the vehicle. Thus, the control of the illumination which is performed by the light unit can be performed to be adaptable to the type of the path.

According to the aspect claimed in claim 5, the vehicle-moving-direction predicting means is provided which predicts a vehicle moving direction intended by a driver in accordance with an operation signal issued from the driver of the vehicle or detected information indicating a state of driving of the vehicle. Thus, a result of prediction of the moving direction can be reflected on the determination of the driving mode.

According to the aspect claimed in claim 6, the vehicle moving direction can easily be predicted in accordance with an instruction signal issued to a direction indicator or a detection signal obtained by the means for detecting the amount of operation of a brake pedal or that of an accelerator pedal.

According to the aspect claimed in claim 7, when a determination has been made that the driving mode is a mode in which the vehicle is being driven on a road in front of which a junction is formed, the quantity of light for illumination which is emitted from side light units attached to side portions of the vehicle is gradually enlarged as the vehicle approaches the junction. Thus, the driver is able to recognize the portion around the junction with satisfactory visibility.

According to the aspect claimed in claim 8, the driving-environment detecting means or the vehicle-moving-direction predicting means has the vehicle driving-state detecting means for detecting a vehicle driving state including speed or acceleration of the vehicle. Thus, the illumination which is performed by the light unit can be controlled to be adaptable to the state of driving of the vehicle.

According to the aspect claimed in claim 9, when a determination is made that the driving mode is a mode in which the vehicle is being driven on a road in front of which a tunnel is formed, the light unit is automatically turned on. As a result, delay in timing at which the light unit is turned on is prevented.

According to the aspect claimed in claim 6, when a determination is made that the vehicle is being driven on a road in front of which a tunnel having intermittent openings or a plurality of tunnels are formed, driving time required for the vehicle to pass through the length of the intermittent openings of the tunnel or the distance between two tunnels is predicted. When the driving time is included in a predetermined range, the illumination control means maintains a state where the light unit is turned on. Therefore, frequent repetitions of the operation in which the light unit is turned on and off whenever the vehicle reaches the intermitting opening in the tunnel or a road between the tunnels is prevented. Thus, the driver of the oncoming vehicle does not erroneously recognize the operation of the light unit which is turned on and off as a signal indicating something.

According to the aspect claimed in claim 7, whether or not the vehicle is being driven on a road having a structure on the road for antiglare is determined. In accordance with a result of the determination, the height of a cut line of a low beam distribution is changed. Thus, when a structure for antiglare exists, the height of the cut line is raised. When no structure for antiglare exists, the height of the cut line is made to be a predetermined height. Thus, the user of the road is not dazzled.

According to the aspect claimed in claim 8, when a determination is made that the driving mode is a mode in which a traffic volume or a traffic density exceeds a predetermined range (when many users use the road), control is performed in such a manner that the height of the cut line of the low beam distribution of the light unit is fixed to a predetermined height or the height does not exceed the upper limit for the height control. Thus, the users of the road are not dazzled.

According to the aspect claimed in claim 9, when a determination is made that the driving mode is a mode in which the vehicle is being driven on a road in an urban area having a large traffic volume or a traffic density, the irradiating range of the light unit is enlarged to an oncoming vehicle lane. Thus, support can be performed in such a manner that the driver of the oncoming vehicle is able to obtain sufficient visibility when the driver of the oncoming vehicle recognizes pedestrians and the like.

According to the aspect claimed in claim 1, the control range of the illumination which is performed by the light unit in the driving mode in which the vehicle is being driven on a road having a small traffic volume or a low traffic density is enlarged as compared with a control range of the illumination which is performed by the light unit in a driving mode in which the vehicle is driven on a road having a large traffic volume or a road having a high traffic density. Thus, the probability that the users of the road having a large traffic volume are dazzled is decreased.

According to the aspect claimed in claim 1, when a determination is made that the driving mode is the curve-road mode in which the vehicle is driven on a road, such as a mountain road, having a multiplicity of curves, the control of the illumination which is performed by the light unit is performed to be adaptable to the shape of the path. As a result, satisfactory visibility for the driver can be maintained when the vehicle is driven on a curved road. Hence, safety in driving the vehicle can be improved.

| DESCRIPTION OF THE REFERENCE NUMERALS | |
| --- | --- |
| 1 | light unit for a vehicle |
| 2 | driving-environment detecting means |
| 3 | mode determining means |
| 4 | illumination control means |
| 5 | light unit |
| 5a | light source |
| 6 | drive means |

| -continued | |
| --- | --- |
| DESCRIPTION OF THE REFERENCE NUMERALS | |
| 7 | vehicle-moving-direction predicting means |
| 8 | instruction means |

What is claimed is:

1. A light unit for a vehicle, comprising:

driving-environment detecting means for detecting information indicating a driving environment provided by a path on which said vehicle is driven;

mode determining means for determining a driving mode which is included among driving modes that represent combinations of information detectable by said driving-environment detecting means and which dynamically changes when said driving environment changes;

illumination control means for controlling illumination which is performed by said light unit in accordance with an instruction signal supplied by said mode determining means and corresponding to said driving mode; and vehicle-moving-direction predicting means for predicting a vehicle moving direction intended by a driver in accordance with at least one of an operation signal issued from said driver of said vehicle and detected information indicating a driving state of said vehicle;

wherein said vehicle-moving-direction predicting means predicts the vehicle moving direction in accordance with a detection signal obtained by means for detecting an amount of operation of at least one of a brake pedal and an accelerator pedal.

2. A light unit for a vehicle according to claim 1, wherein one of said driving-environment detecting means and said vehicle-moving-direction predicting means has vehicle driving-state detecting means for detecting a vehicle driving state including at least one of speed and acceleration of said vehicle.

3. A light unit for a vehicle comprising:

driving-environment detecting means for detecting information indicating a driving environment provided by a path on which said vehicle is driven;

mode determining means for determining a driving mode which is included among driving modes that represent combinations of information detectable by said driving-environment detecting means and which dynamically changes when said driving environment changes; and illumination control means for controlling illumination which is performed by said light unit in accordance with an instruction signal supplied by said mode determining means and corresponding to said driving mode;

wherein, when said mode determining means determines that said driving mode is a mode in which said vehicle is being driven on a road in front of which a junction is formed, said illumination control means gradually increases the quantity of light for illumination which is emitted from side light units attached to side portions of said vehicle as said vehicle approaches said junction.

4. A light unit for a vehicle according to claim 3, wherein said driving-environment detecting means has vehicle driving-state detecting means for detecting a vehicle driving state including at least one of speed and acceleration of said vehicle.

5. A light unit for a vehicle comprising:

driving-environment detecting means for detecting information indicating a driving environment provided by a path on which said vehicle is driven;

mode determining means for determining a driving mode which is included among driving modes that represent combinations of information detectable by said driving-environment detecting means and which dynamically changes when said driving environment changes; and illumination control means for controlling illumination which is performed by said light unit in accordance with an instruction signal supplied by said mode determining means and corresponding to said driving mode;

wherein, when said mode determining means determines that said driving mode is a mode in which said vehicle is being driven on a road in front of which a tunnel is formed, said illumination control means automatically turns said light unit on before an entrance of said tunnel.

6. A light unit for a vehicle comprising:

driving-environment detecting means for detecting information indicating a driving environment provided by a path on which said vehicle is driven;

mode determining means for determining a driving mode which is included among driving modes that represent combinations of information detectable by said driving-environment detecting means and which dynamically chances when said driving environment changes; and illumination control means for controlling illumination which is performed by said light unit in accordance with an instruction signal supplied by said mode determining means and corresponding to said driving mode;

wherein, when said mode determining means determines that said vehicle is being driven on a road in front of which one of a tunnel having intermittent openings and a plurality of tunnels are formed, a driving time required for said vehicle to pass through a length of said intermittent openings of said tunnel and a distance between adjacent tunnels is predicted, and when said driving time is included in a predetermined range, said illumination control means maintains a state where said light unit is turned on.

7. A light unit for a vehicle comprising:

driving-environment detecting means for detecting information indicating a driving environment provided by a path on which said vehicle is driven;

mode determining means for determining a driving mode which is included among driving modes that represent combinations of information detectable by said driving-environment detecting means and which dynamically changes when said driving environment changes; and illumination control means for controlling illumination which is performed by said light unit in accordance with an instruction signal supplied by said mode determining means and corresponding to said driving mode;

wherein said mode determining means determines whether said vehicle is being driven on a road having a structure on said road for antiglare, and said illumination control means changes a height of a cut line of a low beam distribution of said light unit in accordance with a result of said determination.

8. A light unit for a vehicle comprising:

driving-environment detecting means for detecting information indicating a driving environment provided by a path on which said vehicle is driven;

mode determining means for determining a driving mode which is included among driving modes that represent combinations of information detectable by said driving-environment detecting means and which dynamically changes when said driving environment changes; and illumination control means for controlling illumination which is performed by said light unit in accordance with an instruction signal supplied by said mode determining means and corresponding to said driving mode;

wherein, when said mode determining means determines that said driving mode is a mode in which one of a traffic volume and a traffic density exceeds a predetermined range, said illumination control means one of fixes a height of a cut line of a low beam distribution of said light unit and controls said cut line in such a manner that said height does not exceed an upper limit.

9. A light unit for a vehicle comprising:

driving-environment detecting means for detecting information indicating a driving environment provided by a path on which said vehicle is driven;

mode determining means for determining a driving mode which is included among driving modes that represent combinations of information detectable by said driving-environment detecting means and which dynamically changes when said driving environment changes; and illumination control means for controlling illumination which is performed by said light unit in accordance with an instruction signal supplied by said mode determining means and corresponding to said driving mode;

wherein, when said mode determining means determines that said driving mode is a mode in which said vehicle is being driven on a road in an urban area having one of a large traffic volume and a high traffic density exceeding a predetermined range, said illumination control means enlarges an irradiating range of said light unit to an oncoming vehicle lane.

* * * * *